United States Patent
Wicken et al.

(10) Patent No.: US 9,858,835 B2
(45) Date of Patent: Jan. 2, 2018

(54) DISPLAY SUPPORT SYSTEM

(71) Applicant: Balloon Innovations Inc., Westminster, CO (US)

(72) Inventors: Christopher J. Wicken, Golden, CO (US); Gregg A. Wicken, Boulder, CO (US)

(73) Assignee: BALLOON INNOVATIONS INC., Westmister, CO (US)

( * ) Notice: Subject to any disclaimer, the term of this patent is extended or adjusted under 35 U.S.C. 154(b) by 0 days.

(21) Appl. No.: 14/931,631

(22) Filed: Nov. 3, 2015

(65) Prior Publication Data
US 2016/0189578 A1 Jun. 30, 2016

Related U.S. Application Data

(60) Provisional application No. 62/074,532, filed on Nov. 3, 2014, provisional application No. 62/172,577, filed on Jun. 8, 2015.

(51) Int. Cl.
*F16B 45/00* (2006.01)
*G09F 7/18* (2006.01)
(Continued)

(52) U.S. Cl.
CPC ............. *G09F 7/18* (2013.01); *F16B 45/02* (2013.01); *F16M 13/02* (2013.01); *F16B 7/0473* (2013.01);
(Continued)

(58) Field of Classification Search
CPC .............................. F16B 45/04; A44C 5/2038
See application file for complete search history.

(56) References Cited

U.S. PATENT DOCUMENTS

| 262,517 A | 8/1882 | Hendrie | |
|---|---|---|---|
| 1,083,054 A * | 12/1913 | Brown | B25G 1/00 15/246 |

(Continued)

FOREIGN PATENT DOCUMENTS

WO   2015195981 A1   12/2015

OTHER PUBLICATIONS

U.S. Appl. No. 14/742,855, filed Jun. 18, 2015, First Inventor: Christopher J. Wicken.
(Continued)

*Primary Examiner* — Amy Sterling
(74) *Attorney, Agent, or Firm* — Berg Hill Greenleaf & Ruscitti LLC

(57) ABSTRACT

The inventive technology relates to an improved display support system that may be used to support elevated displays, and other promotional/marketing materials. The invention may be used to support, for example, helium-free balloons and/or other displays to one or more display fittings. Such display fittings may further be secured to an adjustable support such that an operator may position one or more fittings in a desired position, such as from a ceiling or other elevated surface. Additional embodiments may include an improved dual display support system that may support a plurality of support adapters each having one or more fitting supports coupled with fitting displays to more efficiently place, support, and/or retrieve elevated displays, and other promotional/marketing materials having multiple anchor positions.

19 Claims, 26 Drawing Sheets

(51) Int. Cl.
*F16M 13/02* (2006.01)
*F16B 45/02* (2006.01)
*F16B 1/00* (2006.01)
*F16B 7/04* (2006.01)
*F16B 9/02* (2006.01)

(52) U.S. Cl.
CPC .............. *F16B 9/023* (2013.01); *F16B 45/00* (2013.01); *F16B 2001/0028* (2013.01); *F16B 2001/0035* (2013.01); *G09F 2007/186* (2013.01)

(56) References Cited

U.S. PATENT DOCUMENTS

| | | | |
|---|---|---|---|
| 1,527,046 A | 10/1922 | Ingram | |
| 1,512,831 A | 10/1924 | Dunnell | |
| 1,535,396 A | 4/1925 | Buehler | |
| 1,648,338 A | 11/1927 | Noel | |
| 1,677,379 A | 7/1928 | Ames | |
| 1,782,070 A | 11/1930 | Lazarus | |
| 1,788,157 A | 1/1931 | Hogan | |
| 1,949,608 A * | 3/1934 | Johnson Ewald E | F16B 45/02 24/599.5 |
| 2,143,691 A | 4/1938 | Goldberg et al. | |
| 2,209,875 A | 7/1940 | Eichelsdoerfer | |
| 2,488,396 A | 11/1949 | Gottholm | |
| 2,664,667 A | 1/1954 | Burroughs | |
| 2,840,948 A | 7/1958 | Stickley | |
| 2,922,252 A | 1/1960 | Dam | |
| 2,924,041 A | 2/1960 | Jackson | |
| 3,150,460 A | 9/1964 | Dees | |
| 3,162,409 A | 12/1964 | Straayer | |
| 3,366,999 A | 2/1968 | Darby | |
| 3,439,079 A | 4/1969 | McDowell | |
| 3,892,081 A | 7/1975 | Goral | |
| 3,920,207 A | 11/1975 | Adamaitis | |
| 4,035,462 A | 7/1977 | Lane, Jr. | |
| 4,589,854 A | 5/1986 | Smith | |
| 4,712,510 A | 12/1987 | Tae-Ho | |
| 4,794,498 A | 12/1988 | Neumeier | |
| 4,895,545 A | 1/1990 | Nelson | |
| 1,953,719 A | 9/1990 | Yaffe | |
| 4,953,713 A | 9/1990 | Yaffe | |
| 5,027,992 A | 7/1991 | Murray | |
| 5,036,985 A | 8/1991 | Lovik | |
| 5,052,733 A | 10/1991 | Cheung et al. | |
| 5,127,867 A | 7/1992 | Lau | |
| 5,188,332 A | 2/1993 | Callas | |
| 5,203,530 A | 4/1993 | Liu | |
| 5,234,726 A | 8/1993 | Dahan | |
| 5,282,768 A | 2/1994 | Akman | |
| 5,564,575 A | 10/1996 | Casement | |
| 5,575,470 A | 11/1996 | Sherman | |
| 5,746,461 A | 5/1998 | Broberg | |
| 5,769,474 A | 6/1998 | Moore | |
| 5,823,365 A | 10/1998 | Page | |
| 5,873,764 A | 2/1999 | Scherr | |
| 5,938,255 A | 8/1999 | Rose et al. | |
| 5,944,576 A | 8/1999 | Nelson et al. | |
| 6,176,558 B1 | 1/2001 | Wu | |
| 6,176,758 B1 | 1/2001 | Wu | |
| 6,273,479 B1 | 8/2001 | Carlson | |
| 6,308,383 B1 * | 10/2001 | Schrader | B60P 7/0807 24/136 R |
| 6,422,914 B1 | 7/2002 | Nelson | |
| 6,478,057 B1 | 11/2002 | Bearss et al. | |
| 6,478,651 B1 | 11/2002 | Weir | |
| 6,745,904 B1 | 6/2004 | Komar | |
| 6,923,141 B1 | 8/2005 | Staats | |
| 6,935,268 B1 | 8/2005 | Hawkins | |
| 6,938,871 B1 | 9/2005 | Carlson | |
| 6,969,295 B1 | 11/2005 | Bidwell | |
| D517,123 S | 3/2006 | Sidwell | |
| 7,017,511 B2 | 3/2006 | Fisher | |
| 7,077,445 B2 * | 7/2006 | Yu | F16B 45/02 24/599.4 |
| 7,249,991 B1 | 7/2007 | Watson | |
| 7,588,477 B2 | 9/2009 | Sidwell | |
| 7,611,395 B2 | 11/2009 | Bonsabiante | |
| D610,208 S | 2/2010 | Hou | |
| 7,810,265 B2 | 10/2010 | Beatty | |
| 7,854,642 B2 | 12/2010 | Nelson | |
| 7,967,344 B2 | 6/2011 | Herren | |
| 8,152,588 B2 | 4/2012 | Hua | |
| D659,200 S | 5/2012 | Wicken | |
| 8,544,407 B2 | 10/2013 | Spray | |
| 8,789,565 B1 | 7/2014 | Wicken | |
| 8,840,440 B2 | 9/2014 | Pierce | |
| 8,968,047 B1 | 3/2015 | Wicken | |
| 9,087,462 B1 | 7/2015 | Gallus | |
| 9,089,784 B2 | 7/2015 | Nelson | |
| 9,132,595 B1 | 9/2015 | Wicken et al. | |
| 2001/0045074 A1 | 11/2001 | Kim | |
| 2004/0077268 A1 | 4/2004 | Wainohu | |
| 2006/0011793 A1 | 1/2006 | Dupuis | |
| 2006/0289707 A1 | 12/2006 | Greenwald et al. | |
| 2006/0292960 A1 | 12/2006 | Muller | |
| 2007/0007424 A1 | 1/2007 | Sifferlin et al. | |
| 2007/0049158 A1 | 3/2007 | Chou | |
| 2007/0218802 A1 | 9/2007 | Gronethal et al. | |
| 2008/0121309 A1 | 5/2008 | Boise et al. | |
| 2008/0166942 A1 | 7/2008 | Hou | |
| 2008/0166943 A1 | 7/2008 | Hou | |
| 2009/0197502 A1 | 8/2009 | Nelson et al. | |
| 2011/0240823 A1 | 10/2011 | Hua | |
| 2012/0211614 A1 | 8/2012 | Parello et al. | |
| 2014/0096867 A1 | 4/2014 | Cayton | |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
Amazon: Arizona Balloons; Jan. 24, 2013.
Free Patents Online IP Research & Communities—Rotational Molding; Jan. 24, 2013.
Giant Advertising Balloons; Jan. 24, 2013.
Polyurethane Balloons—Balloon Country; Jan. 24, 2013.
Professional Weather Balloons, 3, 8, and 16 Foot Diameters, Edmund Scientific; Jan. 24, 2013.
Roto-Balloon Printing; Jan. 24, 2013.
Neather Balloons—NovaLynx Corporation; Jan. 24, 2013.
U.S. Appl. No. 29/4444,898, filed Feb. 5, 2013, First Inventor: Christopher J. Wicken.
Free Patents Online IP Research & Communities—Rotomolding; Jan. 24, 2013.
International Application No. PCT/US15/036527, dated Jul. 21, 2015, First Inventor: Christopher J. Wicken.
International Application No. PCT/US15/036527, dated Jul. 21, 2015 entitled "Modular Balloon Support". Search Report dated Sep. 30, 2015, 4 pages.
International Application No. PCT/US15/036527, dated Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.

(56) References Cited

OTHER PUBLICATIONS

U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.

* cited by examiner

DISPLAY SUPPORT SYSTEM

This application claims the benefit of and priority to U.S. Provisional Application Nos. 62/074,532 filed Nov. 3, 2014, and 62/172,577 filed Jun. 8, 2015. The entire specification and figures of the above-mentioned applications are hereby incorporated in their entirety by reference.

TECHNICAL FIELD

Generally, the inventive technology disclosed herein relates to an improved display support system. More specifically, the inventive technology, in a preferred embodiment, described generally herein relates to an improved magnetic display support system that may be used to support elevated displays, and other promotional/marketing materials. In another preferred embodiment, the invention may be used to support, for example, helium-free balloons and display systems that are positioned inside and/or outside commercial establishments to attract attention and/or highlight a specific promotion or event. In such a preferred embodiment, this may be accomplished through the securement of a display, such as those embodied in U.S. Provisional Application No. 62/013,973, which is herein incorporated in its entirety by reference, to one or more magnetic display fittings. Such display fittings may further be secured to an adjustable support such that an operator may, perhaps using an extender coupled to said adjustable support through an adapter, place one or more fittings in a desired position, such as from a ceiling or on another elevated surface. The current inventive technology provides numerous novel and commercially advantageous features including, but not limited to: 1) an adjustable support system; 2) a locking adapter; 3) a self-securing latch mechanism; and 4) an improved tractable display fitting and support.

Additional embodiments of the inventive technology may include a dual display support system. More specifically, the inventive technology, in a preferred embodiment, described generally herein may include apparatus and methods to support a plurality of support adapters each having a fitting support coupled with a fitting display to more efficiently place, support, and/or retrieve elevated displays, and other promotional/marketing materials that may have multiple anchor positions.

BACKGROUND OF THE INVENTION

Traditional marketing displays are often placed in elevated positions to both generate a clear line of sight to potential consumers, as well as to make use of generally empty space thus maximizing the display's commercial impact without impeding the flow of consumers. Such traditional marketing displays, such as signage, flags, balloons, and even artistic presentations are often secured in elevated positions through simple string based systems. The simplest, and most universal example would be a simple marketing sign, secured to one or more elevated positions by supporting string or rope. While such configuration is simple, it possesses several practical drawbacks. First, such traditional systems may be difficult to elevate to a desired location. In a typical scenario a person would have to bring themselves up to the desired elevation, such as by a ladder or other means, which can be dangerous and often impractical. Second, in many cases the elevated surface may not have sufficient positions to secure a traditional display. Such examples may include sheer surfaces with no positions that could be used as a tie-off, hook or other support. Third, in many cases, the weight of the display may make it prohibitively heavy to secure through traditional means.

To overcome such limitations, several attempts have been made to utilize magnetic anchors to secure traditional displays in elevated locations. However, these attempts to position advertising, marketing and even artistic displays in elevated locations have been met with limited success. For example, U.S. Pat. No. 6,422,622 (hereinafter "Bernard"), describes a magnetic installation and removal device having a magnetic anchor secured to a lug which can be further secured to, for example, a string attached to a display, then elevated to a desired location. However, the configuration in Bernard is limited in several significant ways. First, the placement of the magnetic anchor by balancing it on top of a lug and securing it though the placement of a ring over an extended cylindrical element is inefficient and unstable. Such instability is undesirable as a user would be, due to the vertical configuration of the anchor and lug, positioned directly below the unstable anchor. Second, the lug element is not adjustable, making it impossible to magnetically engage an anchor to non-perpendicular, or other angled surfaces. Third, the inability to adjust the lug and anchor portions further makes it very difficult to position the spiral extension to capture a secured anchor that is in a non-perpendicular position. Fourth, spiral extension does not possess a locking mechanism such that during removal of a secured anchor, it may become dislodged and endanger anyone who might be below, not to mention damaging the display itself. As can be seen, there is a need for a single comprehensive solution to the limitations described above.

The current invention overcomes the limitations of, and indeed surpasses the functionality of the device taught by Bernard. It is therefore the object of the present invention to provide a simple, versatile, cost effective, display support system that may be adjustable to fit a variety of securement positions as well as having an improved safety apparatus for the securement and removal of any magnetically secured fittings among other improvements. Accordingly, the objects of the methods and apparatus described herein address each of the aforementioned problems and goals in a practical manner. Naturally, further objects of the inventive technology will become apparent from the description and drawings below.

SUMMARY OF INVENTION

The inventive technology may include at least one fitting support (1), coupled to a fitting display (26), and adjustably secured to at least one support adapter (10) which may further be secured to an extender. In a preferred embodiment, a fitting display (26) coupled with a marketing display or other display item, may be positioned so as to be transiently secured or held by a fitting support (1), and delivered to a desired location, such as an elevated surface. Once said fitting display (26) is secured to a desired surface, the support adapter (10) may be removed leaving the display item secured to said fitting display (26) in the desired location. In a preferred embodiment, a second portion of a display item may be secured to a second fitting display (26) which may further be transiently secured or held by a fitting support (1) and elevated and secured to a desired location. In this fashion, the current invention may be able to transiently secure one or more display items to an elevated location.

Conversely, in a preferred embodiment, an adjustable fitting support (1), having a display fitting support hook (1a) supporting a self-securing latch mechanism, may be elevated to capture, in this embodiment a ring (23) secured to a display fitting (26). In a preferred embodiment, a display fitting support hook (1a) may be inserted into and catch a ring (23) so as to, in this embodiment, pull the display fitting (26) from its transiently positioned location.

In another preferred embodiment, at least one dual fitting support bridge (28), coupled with an extender may further be coupled with and/or secure a plurality of fitting supports (1) (in this instance adjustable fitting supports) where each are supported by a support adapter (10). These fitting supports (1) may further be coupled to a fitting display (26), and each may be adjustably secured to at least one support adapter (10). Similar to embodiments described above, in one preferred embodiment, a plurality of fitting displays (26) coupled with a marketing display or other display item having one or more anchor points, may be positioned so as to be transiently secured or held by a plurality of fitting supports (1), and delivered to a desired location, such as an elevated surface. Once said fitting displays (26) are secured to a desired surface, the support adapter (10) may be removed leaving the display item secured to said fitting display (26) in the desired location.

In another preferred embodiment, at least one dual fitting support bridge (28), coupled with an extender may further be coupled with and/or secure a plurality of fitting supports (1) (in this instance adjustable fitting supports). Similar to embodiments described above, in one preferred embodiment, a plurality of adjustable fitting supports (1), each having a display fitting support hook (1a) supporting a self-securing latch mechanism, may be elevated together to place and/or capture, in this embodiment one or more rings (23) secured to a display fitting (26). Such plurality of display fitting support hooks (1a) may be independently inserted into and catch a ring (23) so as to, in this embodiment, pull the display fitting (26) from its transiently positioned location.

DETAILED DESCRIPTION OF THE INVENTION

Figure 1A:
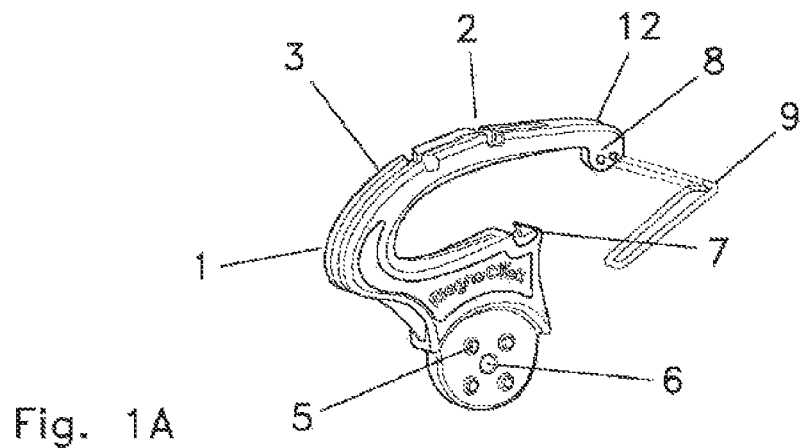
FIGS. 1a-b: is a perspective view of a display support system without a display fitting in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Generally referring to FIGS. 1a-b, 3, and 24-26, the inventive technology may include a display fitting (26). In a preferred embodiment, such a display fitting (26) may include one or more adjustable ring holders (24) further coupled with one or more catch elements, in this case a ring (23). In a preferred embodiment, a display fitting (26) may include an attachment surface having, in this example, a magnet (25). Additional embodiments may include an attachment surface having other attachment elements such as adhesives, Velcro, a suction attachment, a slide locking attachment and the like. As noted above, in a preferred embodiment, a display or other item that a user may wish to place in an elevated or other position may secure such an item to one or more display fittings (26), perhaps through a ring (23) or other separate display attachment element. This display fitting (26), now coupled with a display item, may further be transiently, or temporarily secured to an adjustable fitting support (1) prior to positioning it at an elevated location.

Figure 1B:
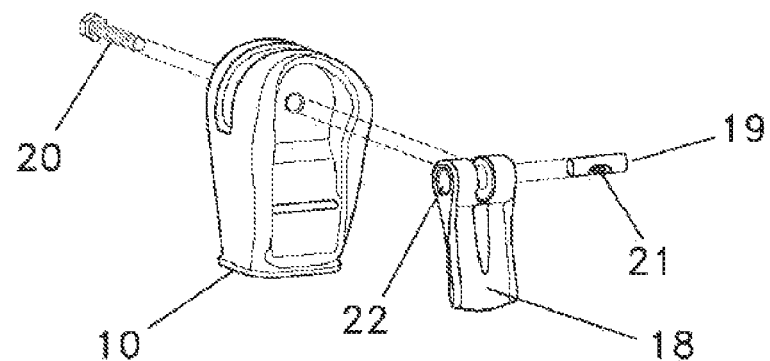
Figure 1B:
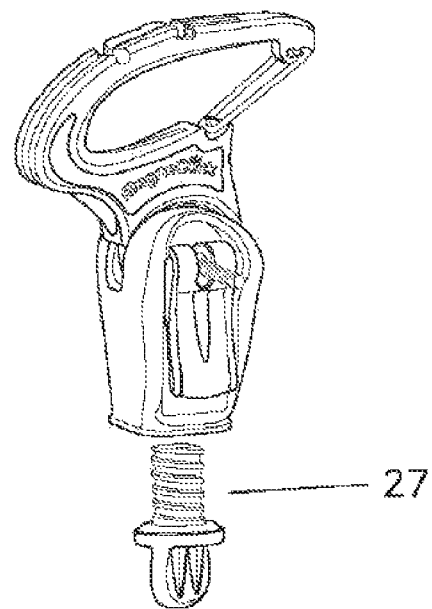
Figure 2:
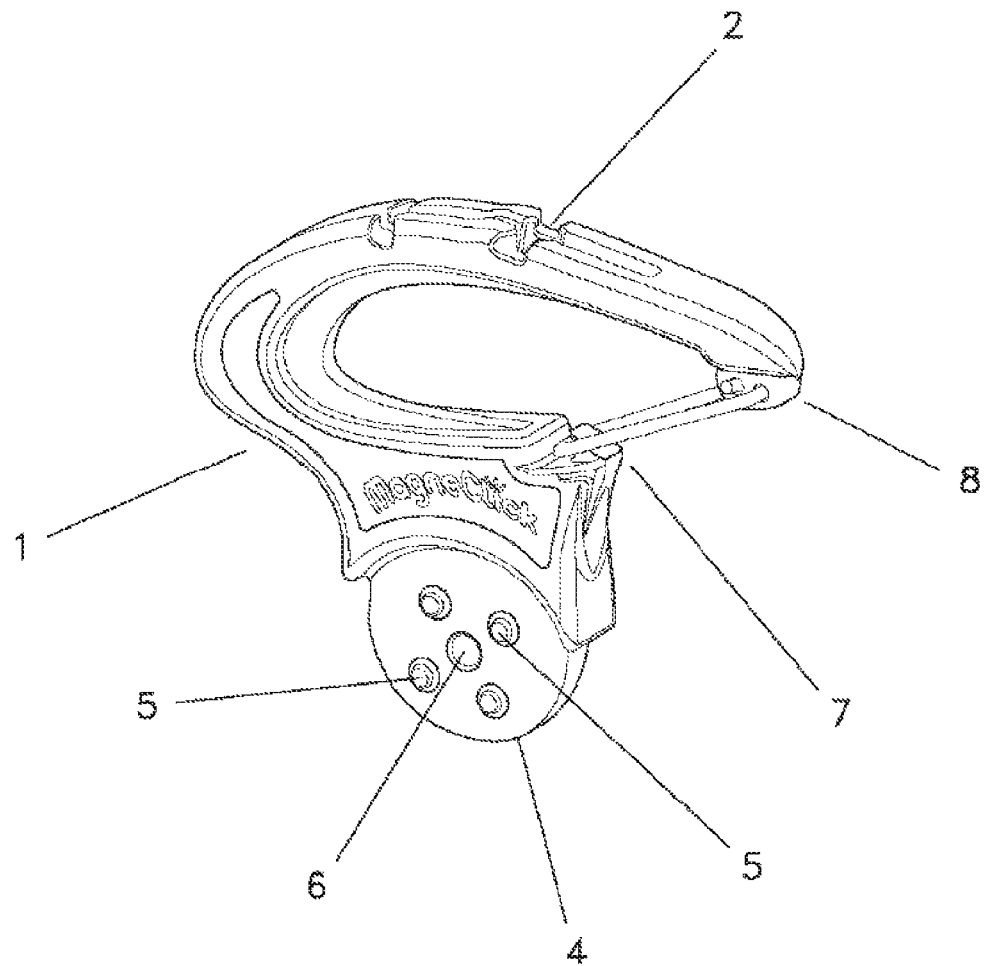
FIG. 2 is an adjustable support element in one embodiment thereof.
Figure 3:
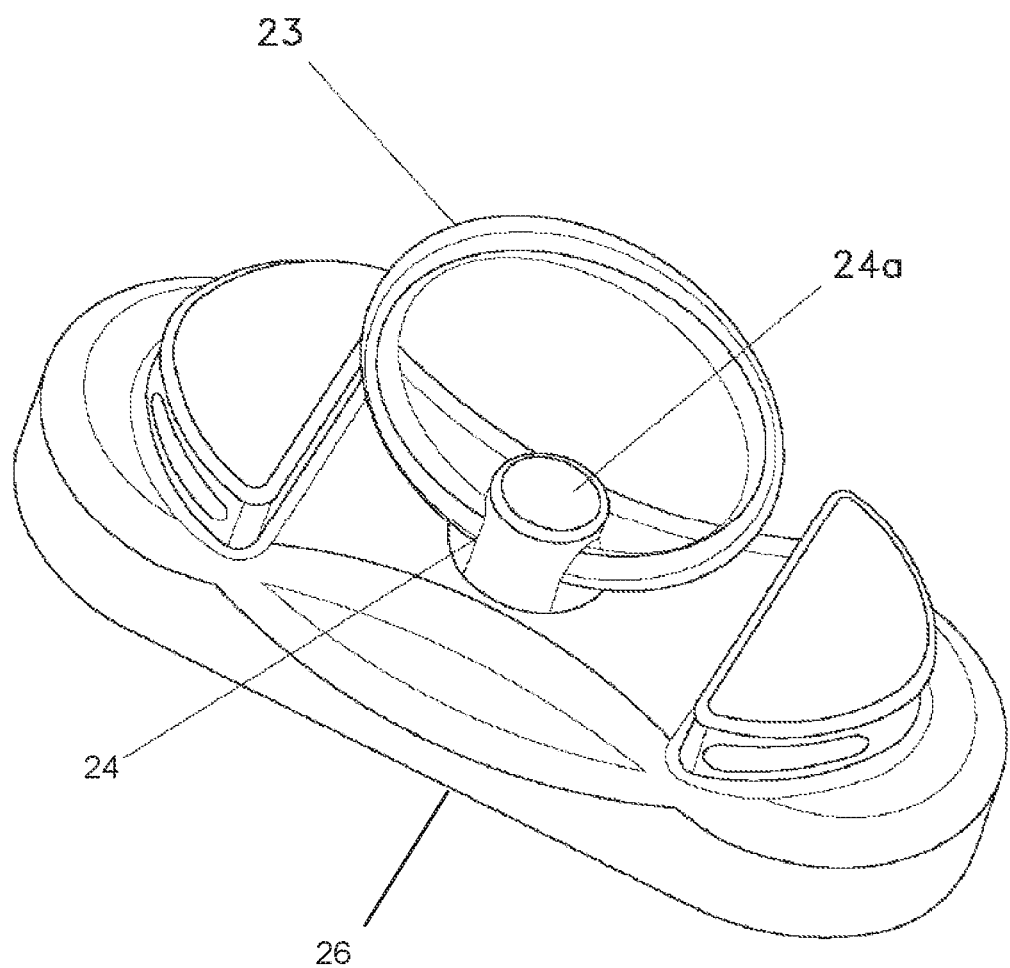
FIG. 3: is a display fitting in one embodiment thereof.

Generally referring to FIGS. 1a-b-2, as noted above, the inventive technology may include at least one fitting support (1), which may further be adjustable. In one preferred embodiment, this adjustable fitting support (1) may be made of a lightweight material, such as hard-plastic or other polymer. Again, as shown in FIG. 2, the adjustable fitting support (1) may include at least one display fitting support hook (1a), which may, in one preferred embodiment, form an extended projection having one or more tractable display fitting apertures (2). In yet another embodiment, a display fitting support hook (1a), may further include a tractable fitting channel (3). In this embodiment, as noted above, a display fitting (26) may be transiently held in place by a display fitting support hook (1a). In one embodiment this display fitting (26) may be coupled with a tractable display fitting aperture (2) through at least one display fitting attachment (24a). In a preferred embodiment, this display fitting attachment, (24a) may include an adjustable ring holder (24) coupled with a display fitting (26) may be inserted into a tractable display fitting aperture (2) which is further coordinated with a tractable fitting channel (3). In this embodiment, insertion of the adjustable ring holder (24) may cause a slight expansion of the tractable fitting channel (3) forming a fitted tractable or pressure seal securing said adjustable ring holder (24) in said display fitting aperture (2) such that the display fitting (26) is transiently secured to the display fitting support hook (1a). As noted in FIG. 2, in some embodiments this tractable display fitting aperture (2) may include one or more lateral cut-outs. In this configuration, when an adjustable ring holder (24), being coupled to a ring (23) is inserted into a tractable display fitting aperture (2), it may be more fully inserted and secured within the aperture where the ring (23) may be positioned within said cut-outs.

Referring generally to FIGS. 1a-b-2, in one embodiment, the inventive technology may include at least one adjustable support plate (4). In a preferred embodiment, this adjustable support plate (4) may be configured to be inserted into one or more corresponding projection channels (12) of a support adapter (10). In this embodiment, such adjustable coupling may allow a forward and reverse hinge movement of the adjustable fitting support (1). Again, as shown in FIGS. 1a-b-2, in a preferred embodiment, an adjustable support plate (4) may have one or more adjustable support plate projections (5). As demonstrated in FIGS. 1a-b and 5, in this embodiment, the adjustable support plate (4) may be inserted into an adjustable support plate interface (11). Such that said adjustable support plate projections (5) may be fitted through one or more projection channels (12) positioned along the internal surface of an adjustable support plate interface (11). Such projection channel(s) (12) may not only guide the insertion of said adjustable support plate (4), but position the fitting support (1) into an initial starting position. Again, referring to FIG. 5, in a preferred embodiment, a support adapter (10) may include one or more projection slots (13) along the internal surface of the adjustable support plate interface (11). In a preferred embodiment, one or more adjustable support plate projections (5) may be fitted into one or more projection slots (13) securing said fitting support (1) into a desired position relative to the support adapter (10). Naturally, as can be seen in the images, a number of adjustable support plate projections (5) may be fitted into one or more projection slots (13) which may be positioned in a circular configuration providing a plurality of pre-configured secured positions into which a fitting support (1) may be secured. As such, a fitting support (1) may be rotated forward or backwards into a desired position relative to the support adapter (10).

Figure 7:
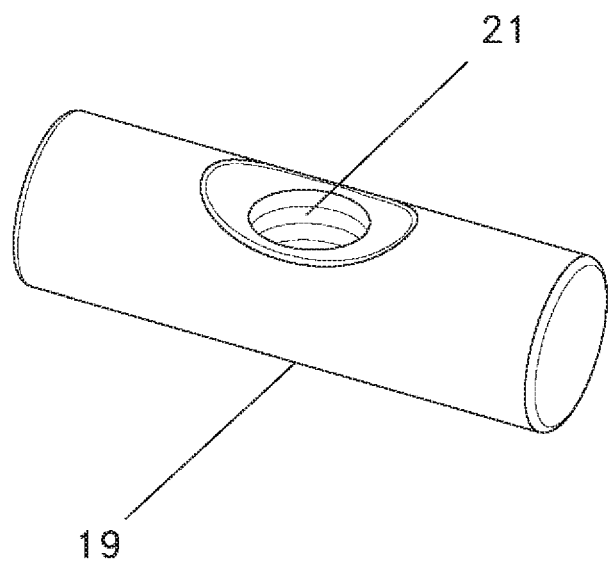
FIG. 7: is a barrel nut in one embodiment thereof.
Figure 8:
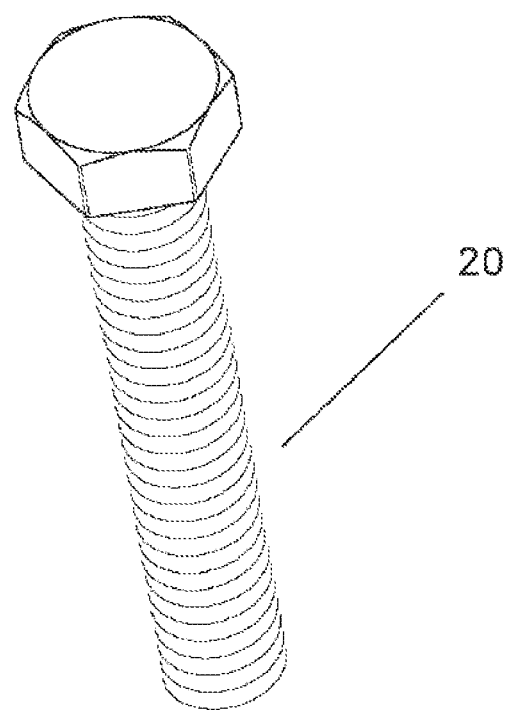
FIG. 8: is a locking bolt in one embodiment thereof.

Referring generally to FIGS. 1a-b, 2, and 5, in certain embodiments, once a fitting support (1) has been positioned in a desired location such that the adjustable support plate projections (5) are fitted into one or more projection slots (13), a user may lock the fitting support (1) into that desired position. In this embodiment, a variety of locking mechanisms may be considered, such as a slide or snap lock. In a preferred embodiment, a cam lock mechanism may be utilized to secure the adjustable support plate (4) within the adjustable support plate interface (11) of the support adapter (10). In this preferred embodiment, at least one locking bolt (20) may be inserted through one or more lock aperture(s) (15) on said support adapter (10) as well as an adjustable support plate aperture (6) coupling said adjustable support plate (4), within the adjustable support plate interface (11) of the support adapter (10). As shown in FIGS. 1a-b and 7, the threaded end of a locking bolt (20) may be threadably secured though a barrel nut aperture (21) integral with a barrel nut (19) which has further been inserted into a cam aperture (22) on a cam (18) which may be positioned in a cam recess (16). In a preferred embodiment, where one end of a locking bolt (20) may be secured by an external lock position (14), rotation of a corresponding cam (18) may act as a cam joint securing a fitting support (1) into a desired position. In this preferred embodiment, once the cam (18) has been rotated to a desired level, it may be positioned within a cam recess (16).

Figure 5:
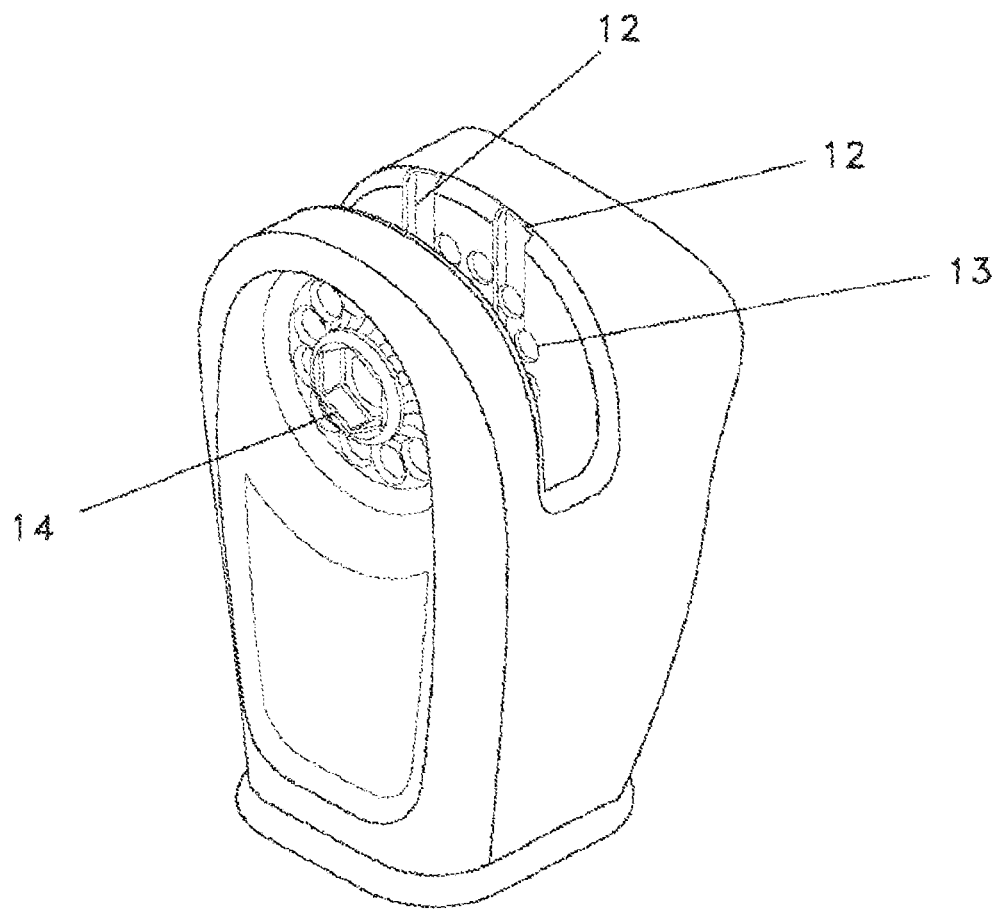
FIG. 5: is an adjustable support adapter in one embodiment thereof.
Figure 6:
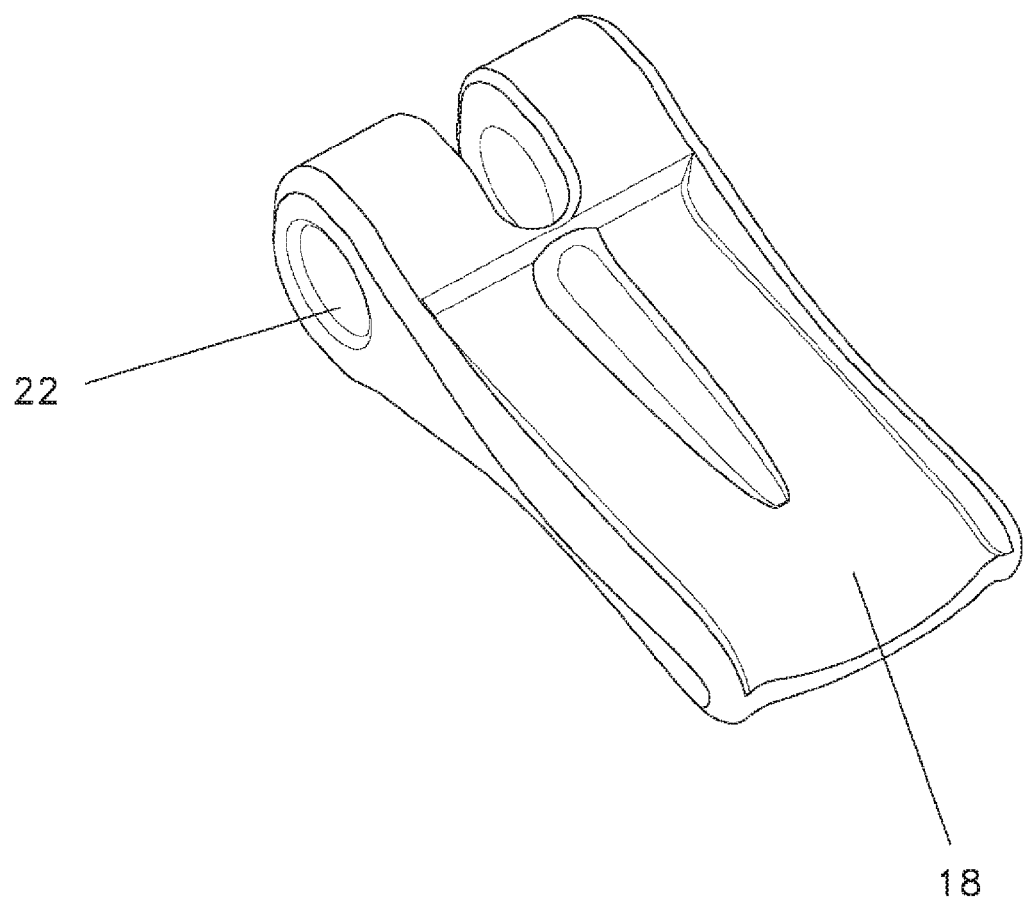
FIG. 6: is a cam in one embodiment thereof.

Referring to FIG. 5, the inventive technology may include a support adapter (10) having one or more extension joints (17). In one embodiment, an extender (27), such as a pole or like device, may be coupled with an extension joint (17), for example on a fitting support (1) or support adapters (10). In one preferred embodiment, an extender (27) having a terminally threaded end is threadably secured by an extension joint (17) such that the coupled fitting support (1) and support adapter (10) may be manually raised to an elevated position. In still other embodiments, such an extension joint (17) may include a snap joint, a sliding lock joint, a pressure lock joint and the like.

Figure 4:
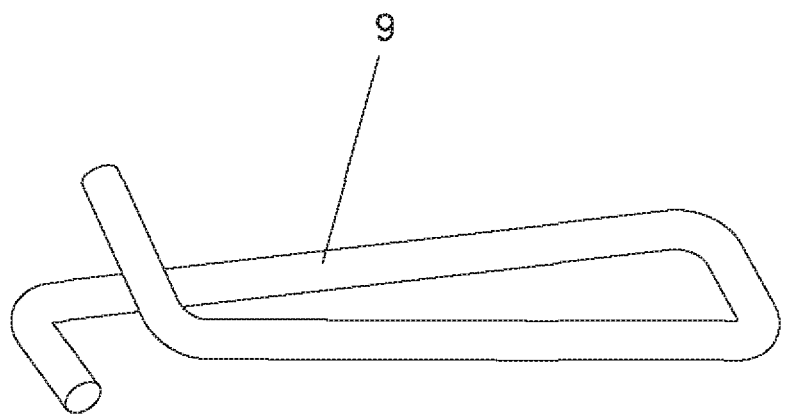
FIG. 4: is a support latch in one embodiment thereof.

Referring generally to FIGS. 1a-b and 4, as discussed previously, where a display fitting (26) has been secured, for example through a magnetic connection to a metal surface, in an elevated position, it may be desired to remove or reposition such an elevated display fitting (26). As such, in one embodiment, the inventive technology may include a support latch (9) coupled to the fitting support (1) to form a self-securing mechanism to secure a captured display fitting (26). In a preferred embodiment, this support latch (9) may be coupled to a fitting support hook (1a) by one or more support latch slots (8) forming a levered joint. In this embodiment, such support latch slots (8) may be off-set, such that a corresponding support latch (9), which, as shown in FIG. 4 may be configured in a staggered formation, forms a natural self-securing pressure lock where the downward arc of the support latch (9) may be mechanically stopped by a support catch (7), in this embodiment being integral with the underside of a fitting support hook (1a).

This preferred embodiment may allow a user to insert a display fitting support hook (1a) into, for example a ring (23) coordinated with display fitting (26). In this configuration, a user may apply an external force causing the display fitting (26) to detach from, for example, an elevated surface. In a preferred embodiment, as a ring (23), or other similar catch element slides down the length of fitting support hook (1a), causing the support latch (9) to be retracted and decoupled from the support catch (7). This support latch (9) may continue to be levered upward as the ring passes down its length. Once the ring has cleared the terminal end of the support latch (9) the natural action of the self-latching mechanism may cause the support latch (9) to re-extend until it is mechanically stopped by the support catch (7) securing the ring (23) and display fitting (26) within the fitting support (1). Such natural latching mechanism allows the removal of a display fitting (26) from, for example, an elevated position without the risk of becoming detached.

Figure 9:
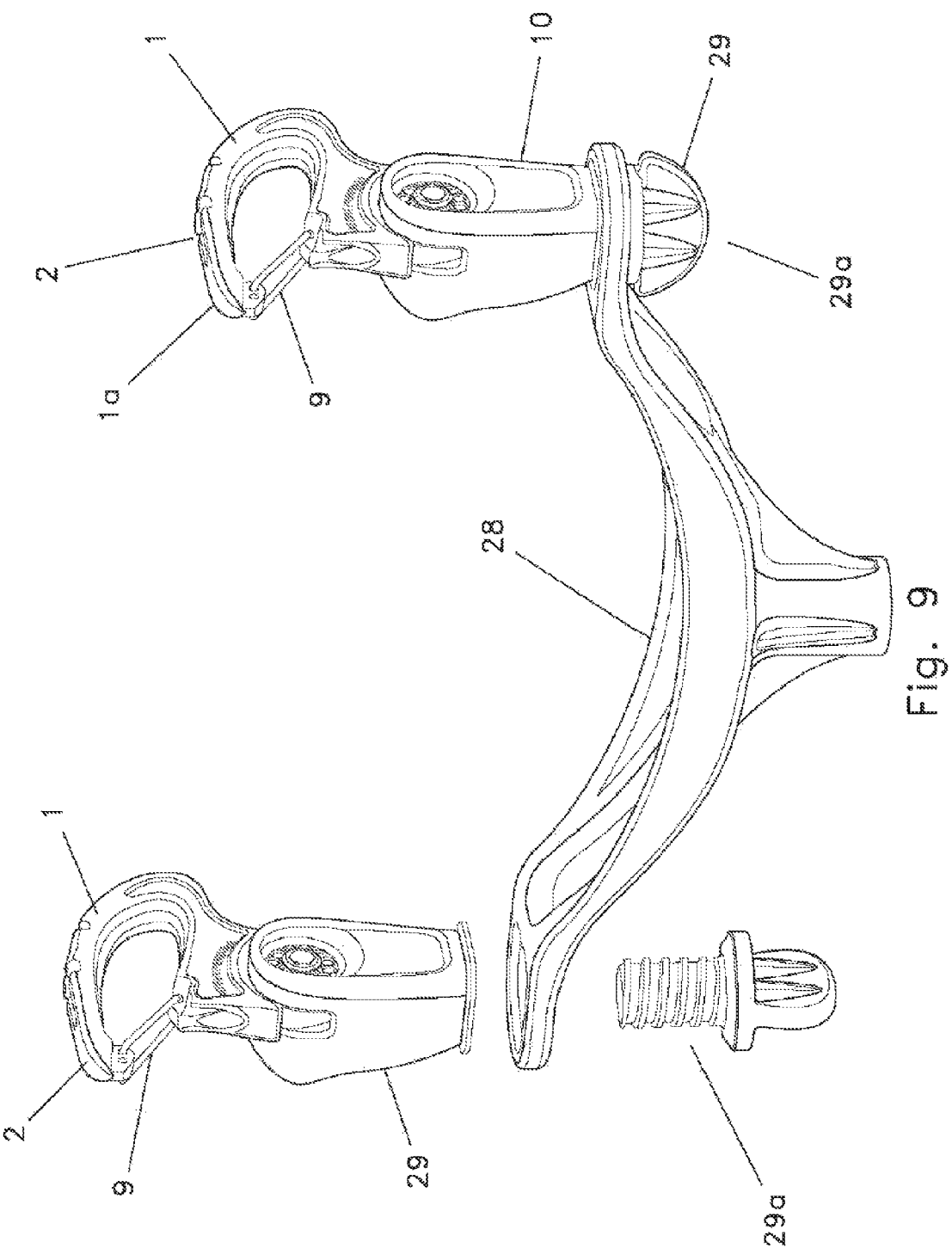
FIG. 9: is an angled view of a dual fitting support bridge securing two fittings supports in one embodiment thereof.
Figure 10:
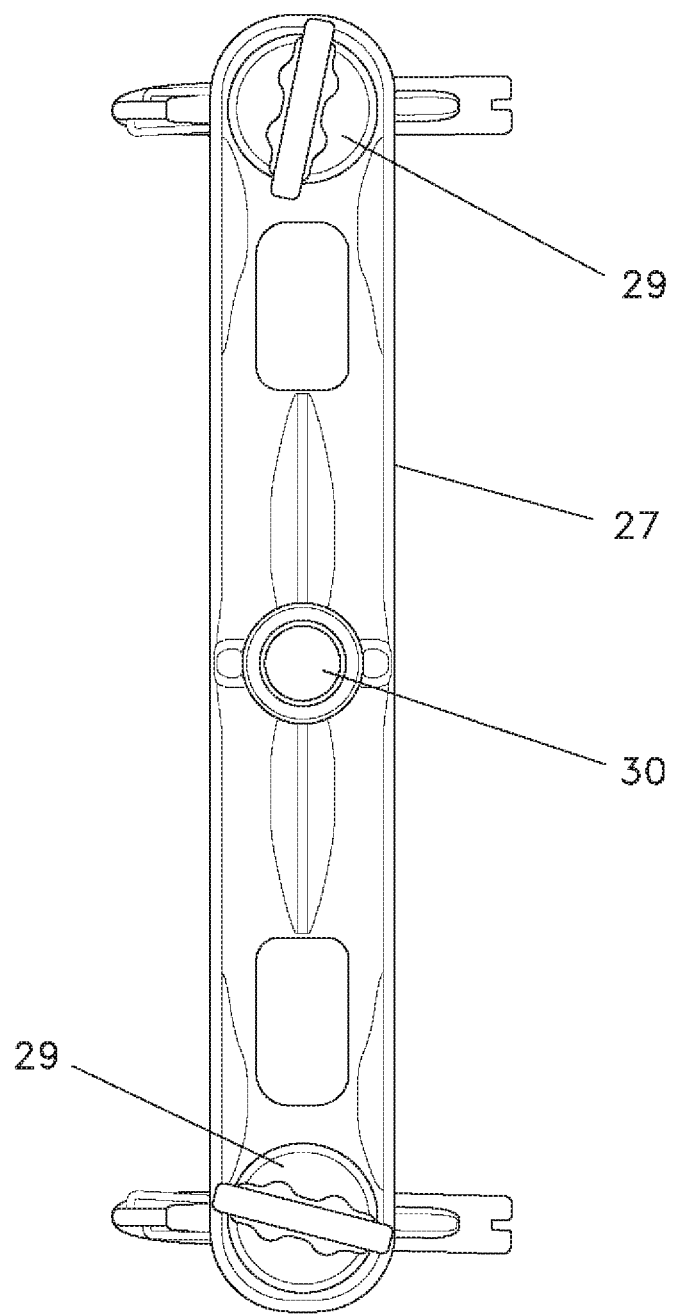
FIG. 10: is a front view of a dual fitting support bridge securing two fittings supports in one embodiment thereof.

Generally referring to FIGS. 9-10, one embodiment of the inventive technology includes at least one dual fitting support bridge (28) that may be configured to be coupled with and support a plurality of support adapters (10) each of which may further be adjustably coupled with a fitting support (1), coupled to a fitting display (26). In a preferred embodiment, a dual fitting support bridge (28) may be secured to an extender (27), for example through a bridge extension joint (30). In a preferred embodiment, a plurality of support adapters (10) may be secured to at least one dual fitting support bridge (28). As demonstrated in FIGS. 9-10, in one embodiment, a plurality of support adapters (10) may be secured to a dual fitting support bridge (28) by engagement of one or more couplers, such as in one embodiment twistable screws (29) that may inserted through a support bridge aperture (30) into and coupled with the extension joint (17) of said support adapter (10).

In a preferred embodiment, a plurality of fitting displays (26) coupled with a marketing display or other display item having a plurality of anchoring points, may be positioned so as to be transiently secured or held by a plurality of fitting supports (1) secured to said dual fitting support bridge (28), and delivered to a desired location, such as an elevated surface. Once a first fitting display (26) is secured to a desired surface, the support adapter (10) may be removed leaving the display item secured to said fitting display (26) in the desired location. This process may be repeated for any additional fitting supports (1) secured to said dual fitting support bridge (28). For example, in a preferred embodiment, a second portion of a display item may be secured to a second fitting display (26) which may further be transiently secured or held by a fitting support (1) secured to said dual fitting support bridge (28) and elevated and secured to a desired location. In this fashion, the current invention may be able to transiently secure one or more display items to a plurality of elevated locations.

In another preferred embodiment, a user may again couple one or more fitting supports (1) secured to said dual fitting support bridge (28) which may be further coupled to an extender (27). In this configuration a user may elevate and insert a display fitting support hook (1a) into, for example a ring (23) coordinated with said display fitting (26). In this configuration, a user may apply an external force causing the display fitting (26) to detach from, for example, an elevated surface. In a preferred embodiment, a ring (23), or other similar catch element slides down the length of fitting support hook (1a), causing the support latch (9) to be retracted and decoupled from the support catch (7). This support latch (9) may continue to be levered upward as the ring passes down its length. Once the ring has cleared the terminal end of the support latch (9) the natural action of the self-latching mechanism may cause the support latch (9) to re-extend until it is mechanically stopped by the support catch (7) securing the ring (23) and display fitting (26) within the fitting support (1). Such natural latching mechanism allows the removal of a display fitting (26) from, for example, an elevated position without the risk of becoming detached. Similar to embodiments described above, this process may be repeated to capture and remove multiple display fittings (26) that may be coordinated with, or supporting, a display. Naturally, in a certain embodiment, a single fitting support (1) secured to a dual fitting support bridge (28) which may be further coupled to an extender (27) may be used to place or retrieve one or more display fittings (26) according to a user's preference.

Figure 11:
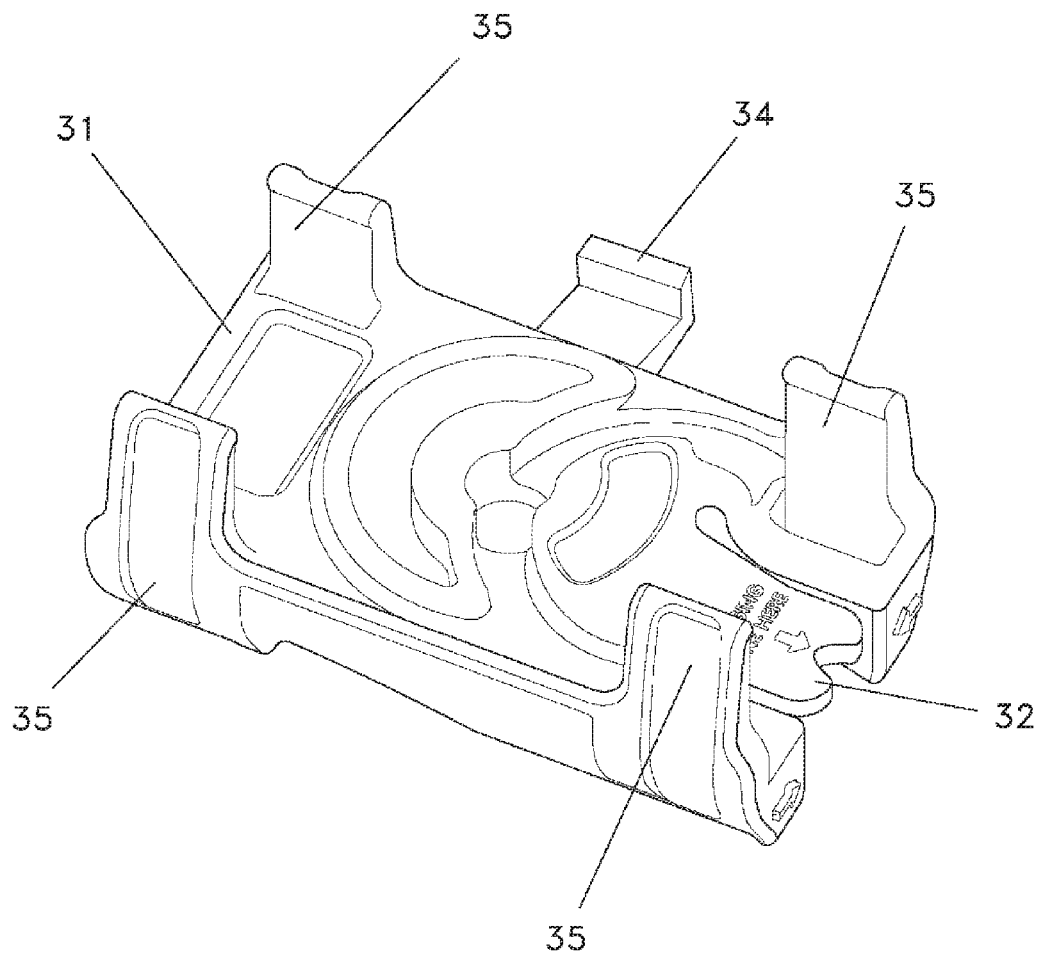
FIG. 11: is a perspective view of a fitting display adaptor in one embodiment thereof.
Figure 12:
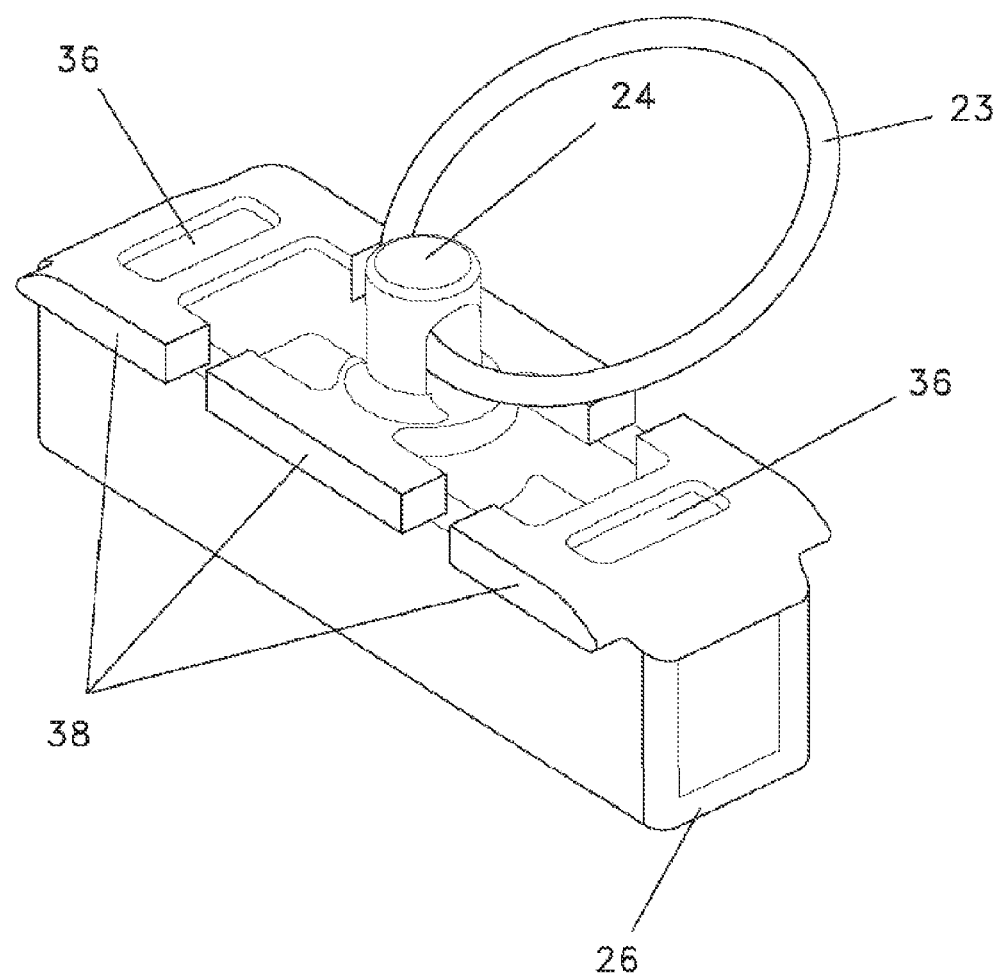
FIG. 12: is a perspective view of a fitting display having a plurality of rails in one embodiment thereof.
Figure 13:
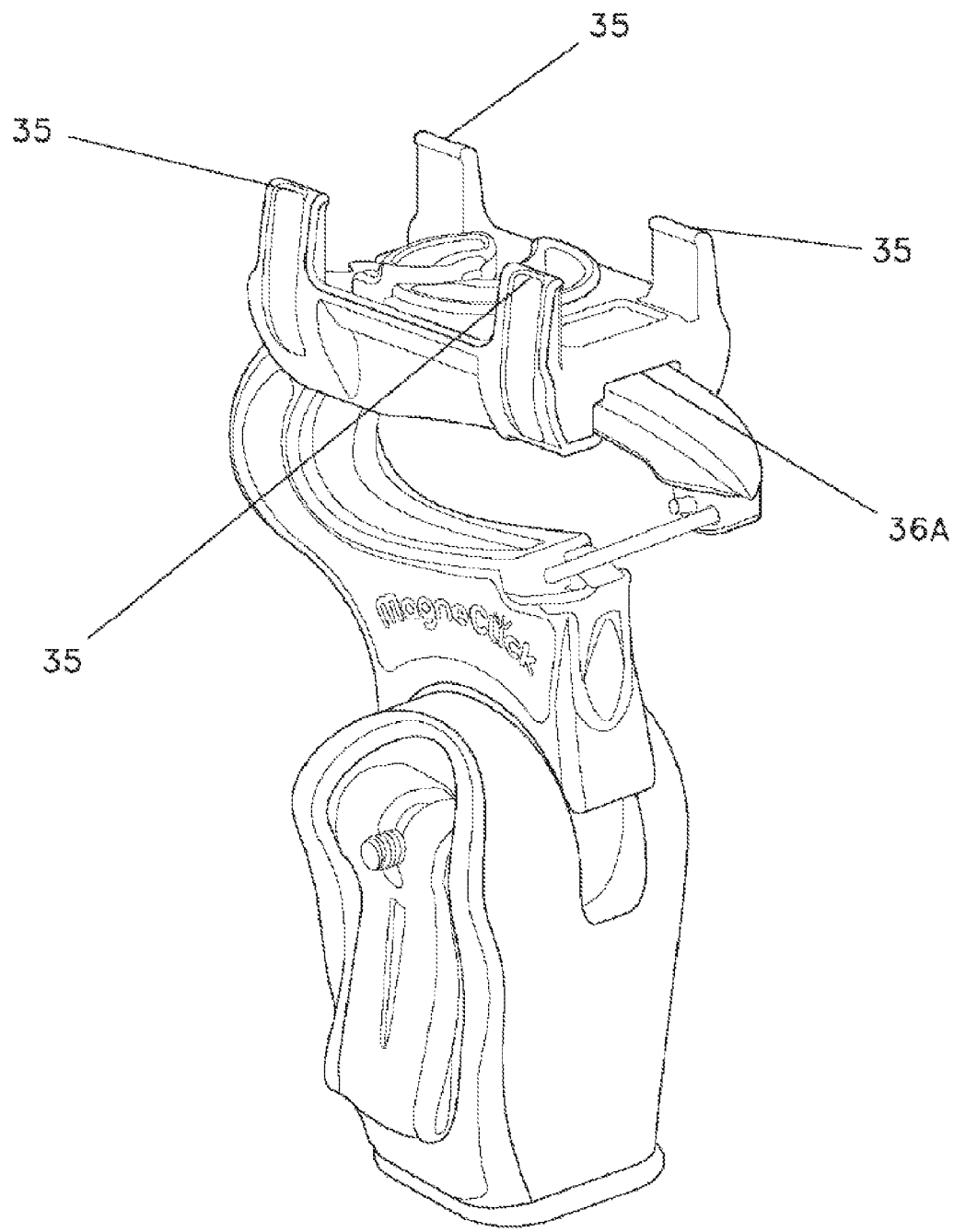
FIG. 13: is a perspective view of a fitting support coupled with a fitting display adaptor in one embodiment thereof.
Figure 14:
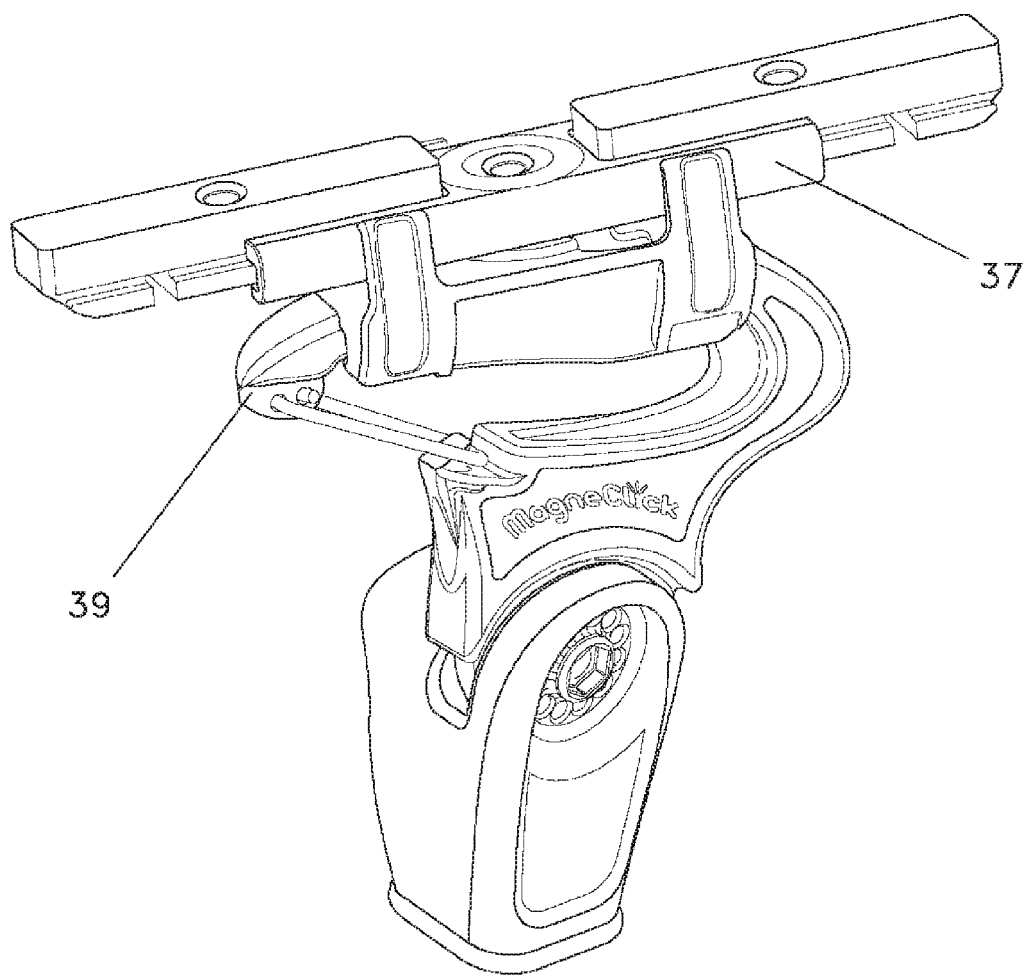
FIG. 14: is a perspective view of a fitting display adaptor coupled with a fitting display support tray which is securing a plurality of fitting displays in one embodiment thereof.
Figure 15:
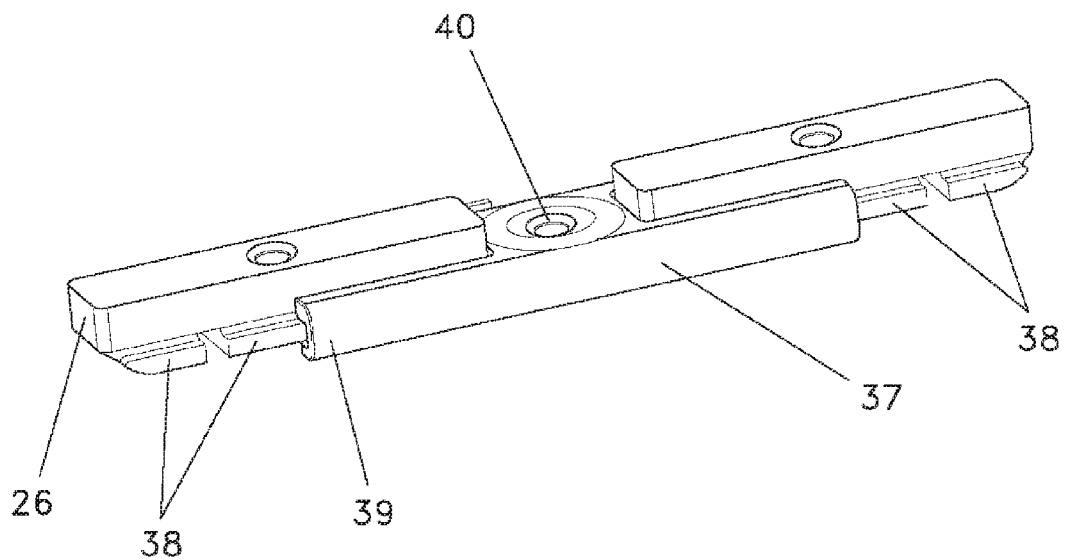
FIG. 15: is a perspective view of a fitting display support tray securing a plurality of fitting displays in one embodiment thereof.
Figure 16:
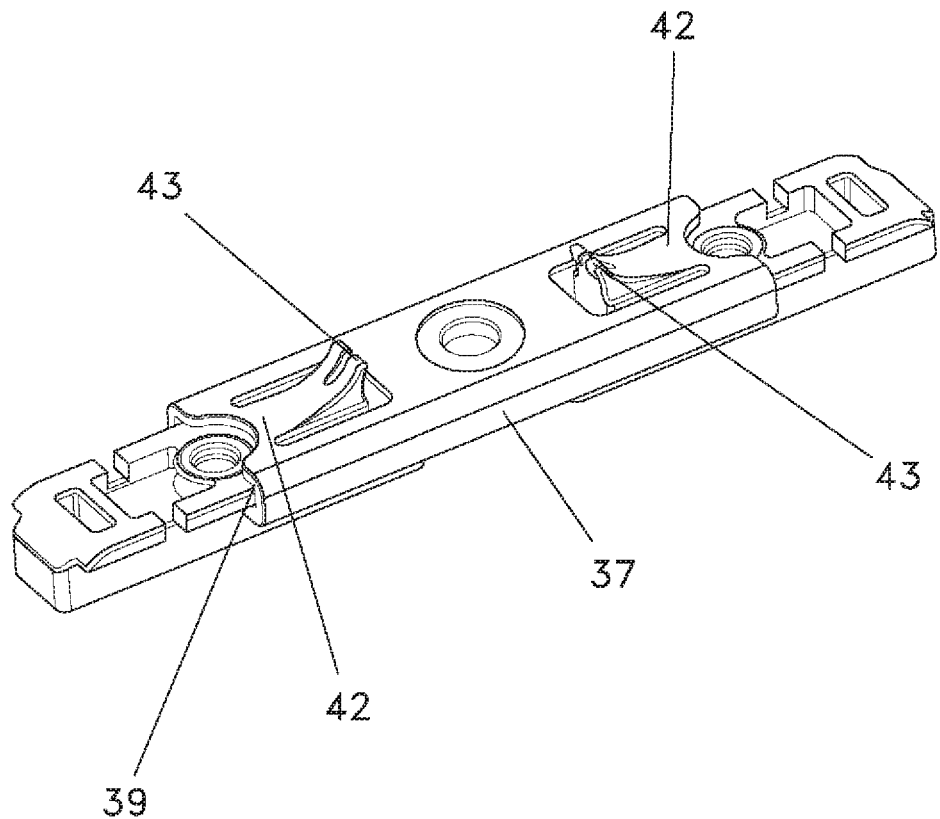
FIG. 16: is a bottom perspective view of a fitting display support tray securing a plurality of fitting displays in one embodiment thereof.
Figure 17:
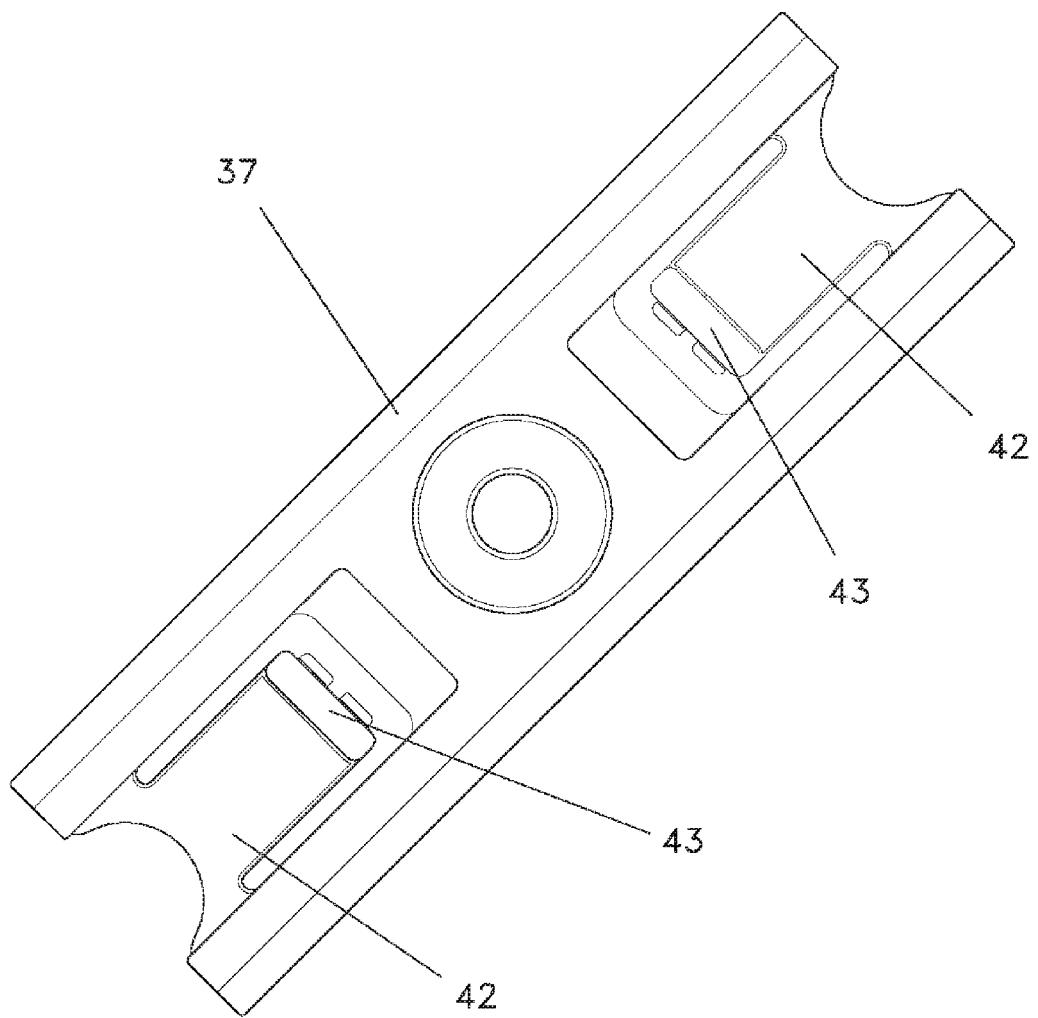
FIG. 17: is a perspective view of a fitting display support tray in one embodiment thereof.
Figure 18:
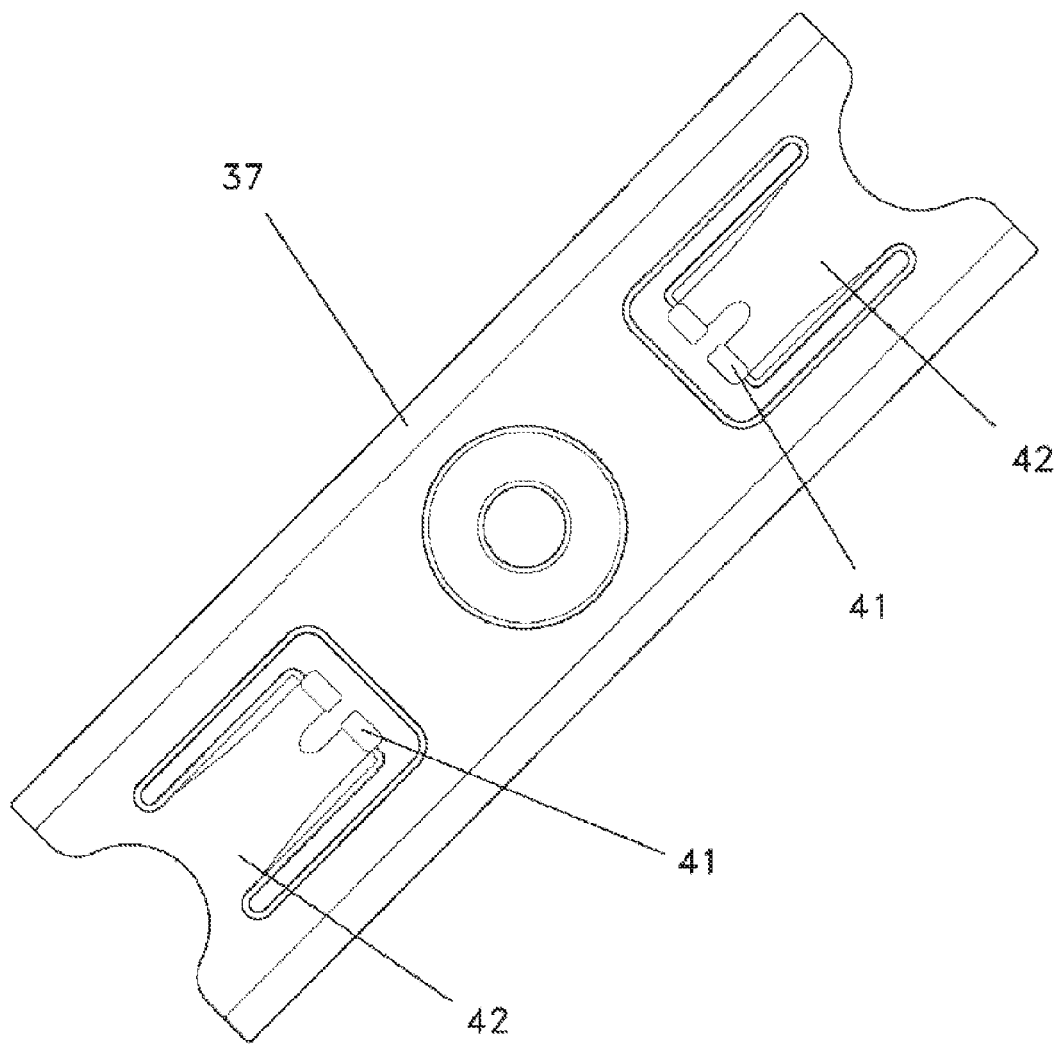
FIG. 18: is a bottom perspective view of a fitting display support tray in one embodiment thereof.

Generally referring to FIGS. 11-13, in one embodiment the inventive technology may include one or more fitting display adaptors (31) that may be coupled with an adjustable fitting support (1). In a preferred embodiment a fitting display adaptor (31) may be coupled with a display fitting support hook (1a) supporting a self-securing latch mechanism. As generally shown in the figures, in this embodiment a fitting support hook (1a) may be inserted into a fitting display channel (36a) securing the fitting display adaptor (31) onto the adjustable fitting support (1). In a preferred embodiment a fitting display adaptor (31) may be secured in place through a fitted joint providing a pressure coupling between the fitting support hook (1a) fitting display channel (36A). Said fitting display adaptor (31) may be further secured to a fitting support hook (1a) by insertion of an adaptor extension (not shown) into one or more tractable display fitting apertures (2) on said fitting support hook (1a).

Again generally referring to FIGS. 11-13, in a preferred embodiment a display fitting (26) having an embedded magnet may further be coupled with a fitting display adaptor (31). In a preferred embodiment, a single display fitting (26) having one or more fitting display support catches (36) may be secured to a fitting display adaptor (31) through the engagement or insertion of one or more fitting display supports (34) into one or more fitting display support catches (36). In another preferred embodiment, a display fitting (26) may be further coupled with a fitting display adaptor (31) through the insertion of a display fitting attachment (24a) or adjustable ring holder (24) or other display fitting extension on a display fitting (26) into one or more adaptor apertures (33).

In a preferred embodiment, a display fitting (26) may be secured to a fitting display adaptor (31) which may further be coupled with said fitting support (1), perhaps by insertion of a fitting support hook (1a) on said fitting support (1) into a fitting display channel (36A). In this embodiment, the display fitting (26) may further include an adjustable ring holder (24) securing a ring (23). This ring may be coupled with a string or other element that may be attached to a display that may be elevated. In one embodiment this string may be positioned within an adaptor string channel (32) and further within a channel along the outer surface of a fitting support hook (1a) to prevent entanglement.

In the preferred embodiment, one or more fitting displays (26) coupled with a marketing display or other display item having a plurality of anchoring points, may be positioned so as to be transiently secured or held by a fitting support (1) secured to fitting display adaptor (31), and delivered to a desired location, such as an elevated surface. Once a first fitting display (26) is secured, through a magnet or other adhesive, suction or latching mechanism to a desired surface, the fitting support (1) and fitting display adaptor (31) may be removed, leaving the display item secured to said fitting display (26) in the desired location. This process may be repeated to secure additional fitting displays (26). In this fashion, the current invention may be able to transiently secure one or more display items to a plurality of elevated locations.

Another preferred embodiment may remove the fitting display adaptor (31) and insert a display fitting support hook (1*a*) into, for example a ring (23) coordinated with said display fitting (26). In this configuration, a user may apply an external force causing the display fitting (26) to detach from, for example, an elevated surface. In a preferred embodiment, a ring (23), or other similar catch element slides down the length of a fitting support hook (1*a*), causing the support latch (9) to be retracted and decoupled from the support catch (7). This support latch (9) may continue to be levered upward as the ring passes down its length. Once the ring has cleared the terminal end of the support latch (9) the natural action of the self-latching mechanism may cause the support latch (9) to re-extend until it is mechanically stopped by the support catch (7) securing the ring (23) and display fitting (26) within the fitting support (1). Such natural latching mechanism allows the removal of a display fitting (26) from, for example, an elevated position without the risk of becoming detached. Similar to the embodiments described above, this process may be repeated to capture and remove multiple display fittings (26) that may be coordinated with, or supporting a display.

Generally referring to FIGS. 14-23, in one embodiment of the inventive technology a fitting display adaptor (31) may further be secured to one or more fitting display support trays (37). In one embodiment generally referred to in FIGS. 14-18, a fitting display adaptor (31) may be coupled with a fitting display support tray (37) which may further be coupled to one or more display fittings (26). In a preferred embodiment, the fitting display support tray (37) may be inserted onto said fitting display adaptor (31) and secured by one or more fitting display tray catches (35). In this embodiment, a fitting display (26), having one or more rails (38) may be inserted into a fitting display support tray channel (39) similar to a tongue and groove connection. These fitting display tray catches (35) may provide a pressure coupling sufficient to allow the fitting display support tray (37) to be secured to fitting display adaptor (31) while placing one or more display fittings (26) at an elevated location without fear of it becoming loose and falling, however, this pressure fitting may be sufficiently weak to allow the force of the magnet(s) or other adhesive to be such that when said display fittings (26) are positioned and the fitting support (1) withdrawn, the fitting display support tray (37) remains coupled with said display fittings (26) at their elevated position.

In another preferred embodiment, a fitting display support tray (37) may include one or more compressible fitting display support catches (42) which may further include at least one adaptor catch extension (43). In this preferred embodiment, a fitting display support tray (37) may be inserted onto said fitting display adaptor (31) and secured by one or more fitting display tray catches (35). The fitting display support tray (37) may further be secured by the action of one or more compressible fitting display support catches (42). In this preferred embodiment, as the fitting display support tray (37) is inserted into a fitting display adaptor (31), the compressible fitting display support catches (42) may be compressed slightly allowing insertion of the fitting display adaptor (31). At a certain position an adaptor catch extension (43) on said compressible fitting display support catches (42) may be allowed to extend and be physically secured within the fitting display adaptor (31). In one embodiment an adaptor catch extension (43) may extend into a catch position, or may in other embodiments be coupled within a groove, or raised surface so as to secure the fitting display support tray (37) with said fitting display adaptor (31). As noted previously, such coupling may be transient such that it may become detached with the removal of a fitting support (1) and fitting display adaptor (31) while the fitting display support tray (37) remains coupled with said display fittings (26) at their elevated or other position.

In another preferred embodiment, said fitting display (26) may be further secured to the fitting display support tray (37) through the coupling of a compressible fitting display support catch (42). In this embodiment, as a fitting display (26) having one or more rails (38) is inserted into a fitting display support tray channel (39), a fitting display support catch (42) may be compressed allowing insertion into a fitting display channel (36*a*). When the fitting display (26) is placed over a catch extension (43) on said fitting display support catch (42), this extension may move upward into the catch and secure the fitting display (26) into the fitting display support tray (37). Naturally this embodiment is merely exemplary as additional coupling devices are contemplated such as snap, twist or other mechanical locks as well as various adhesives and magnets configurations.

As generally noted, in certain embodiments shown in FIGS. 14-18, the fitting display (26) may include an adjustable ring holder (24) securing a ring (23). In a preferred embodiment, for example a string may be secured to a display and a corresponding ring (23) on a fitting display (26). This string may be inserted through an aperture (40) on the fitting display support tray (37) and may further be coordinated with an adaptor string channel (32) and further within a channel along the outer surface of a fitting support hook (1*a*) to prevent entanglement. In another embodiment which is not shown, a fitting display (26), perhaps coordinated with string and display, may be secured to the aperture (40) on the fitting display support tray (37) through insertion of an adjustable ring holder (24) into said aperture (40).

Figure 19:
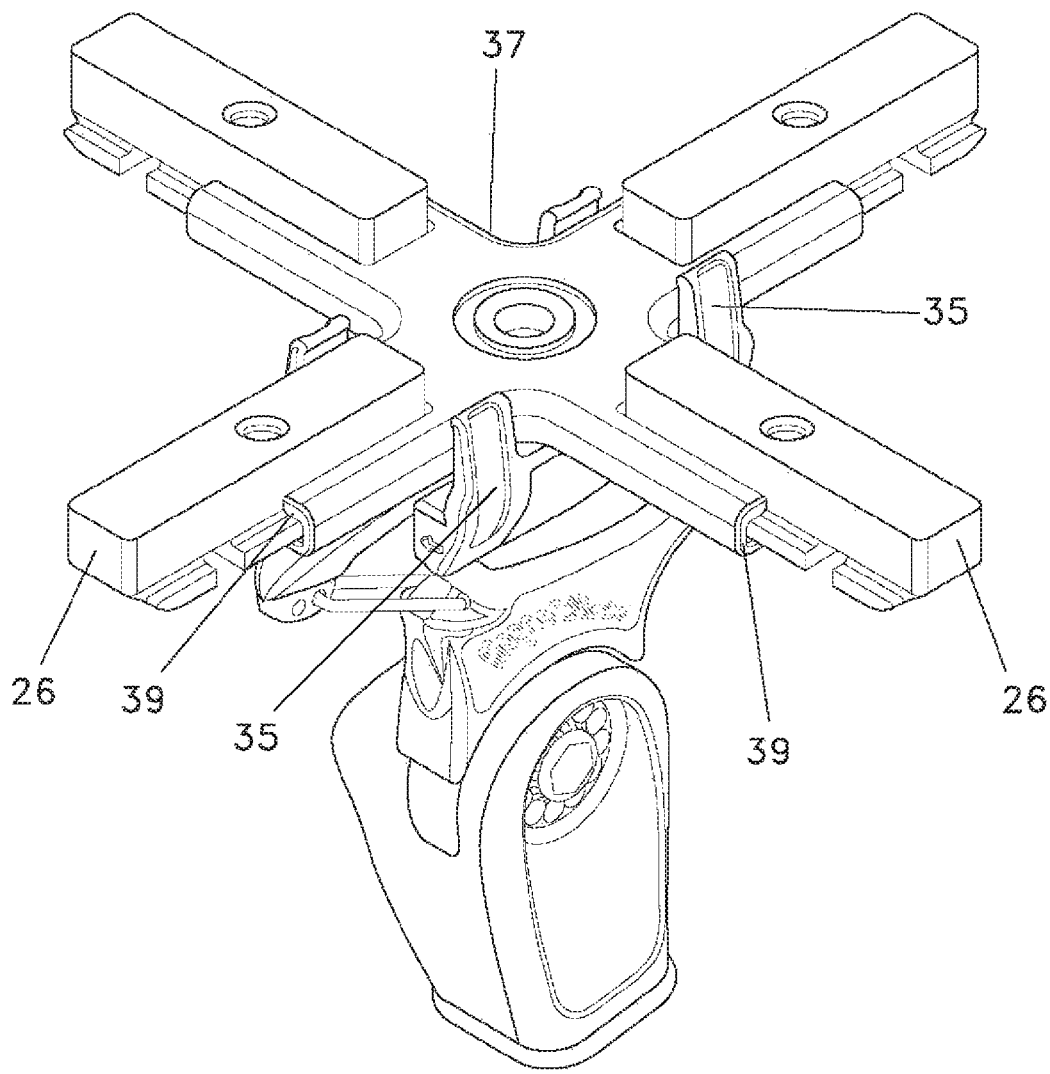
FIG. 19: is a perspective view of a fitting display adaptor coupled with a fitting display support tray which is securing a plurality of fitting displays in a cross-configuration in one embodiment thereof.
Figure 20:
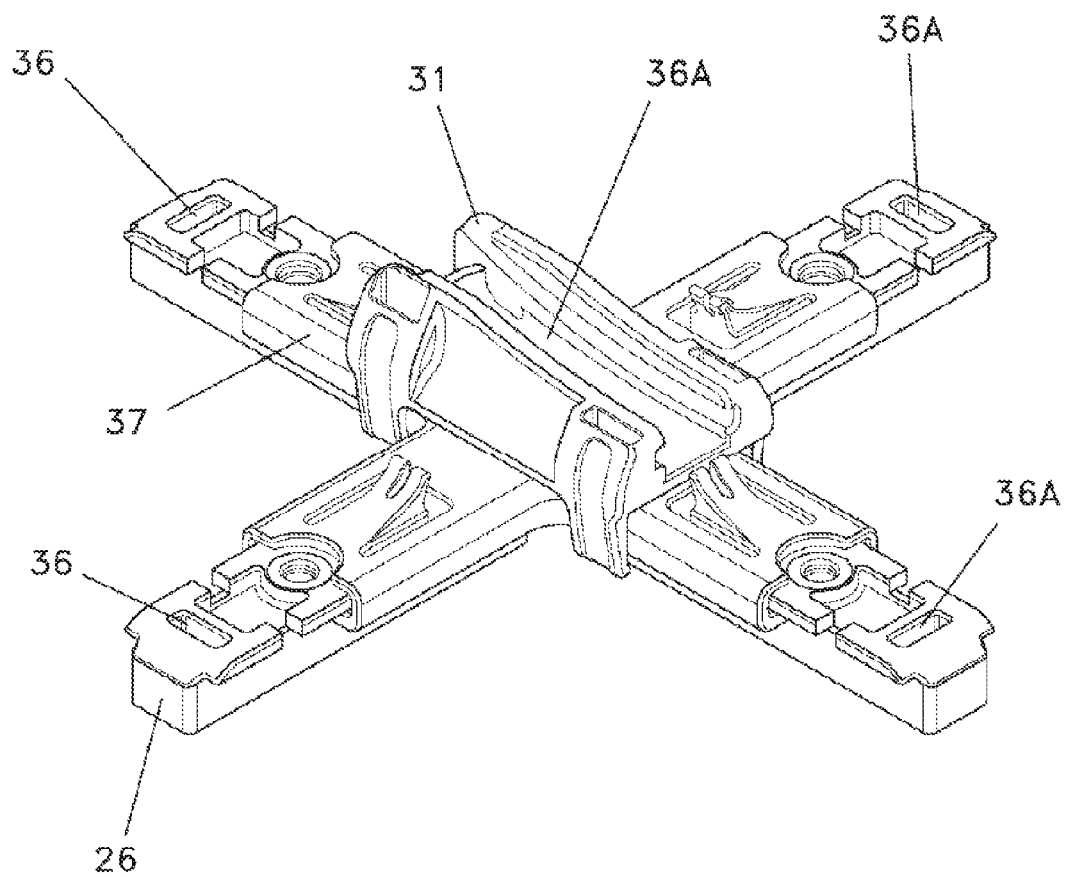
FIG. 20: is a bottom perspective view of a fitting display adaptor coupled with a fitting display support tray which is securing a plurality of fitting displays in a cross-configuration in one embodiment thereof.
Figure 21:
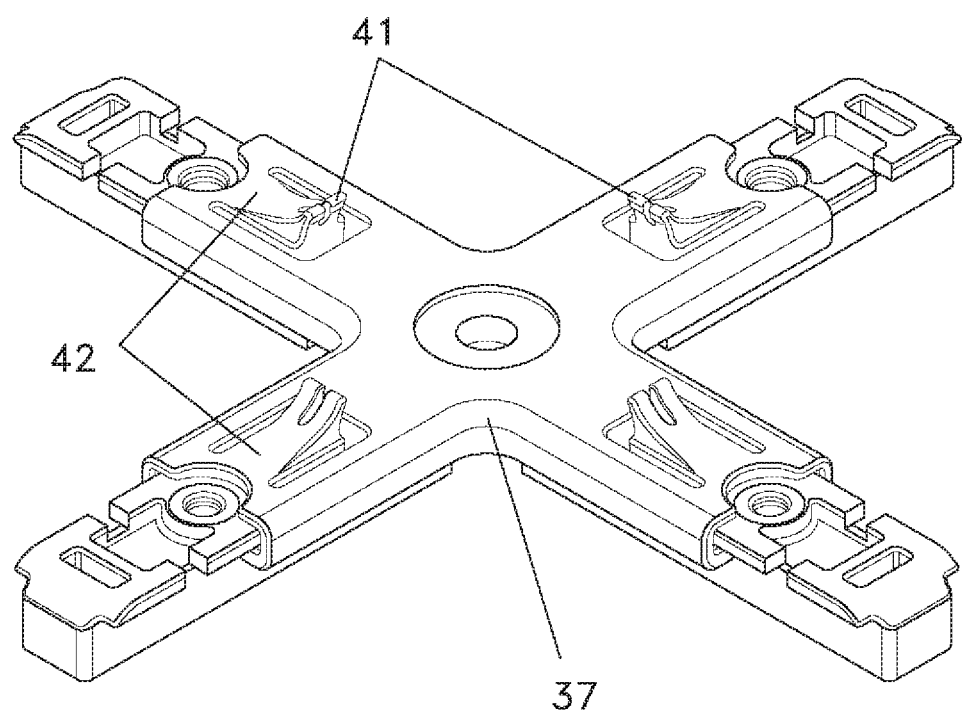
FIG. 21: is a bottom perspective view of a fitting display support tray which is securing a plurality of fitting displays in a cross-configuration in one embodiment thereof.
Figure 22:
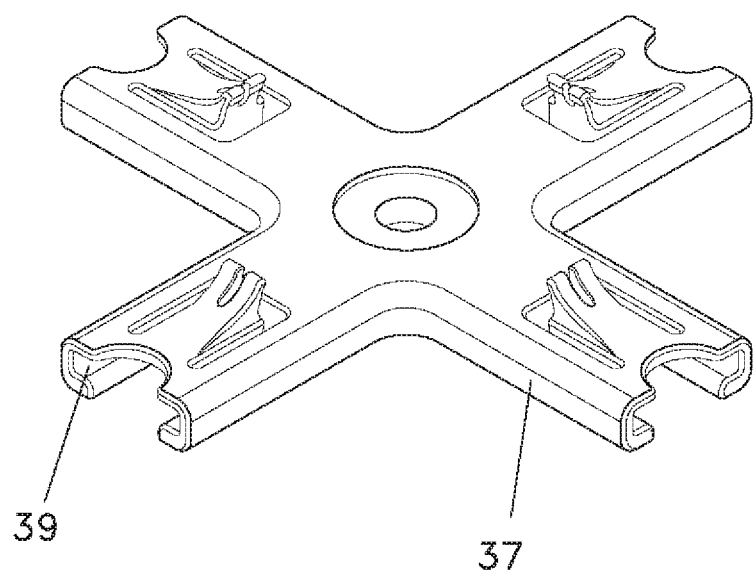
FIG. 22: is a bottom perspective view of a fitting display support tray in one embodiment thereof.
Figure 23:
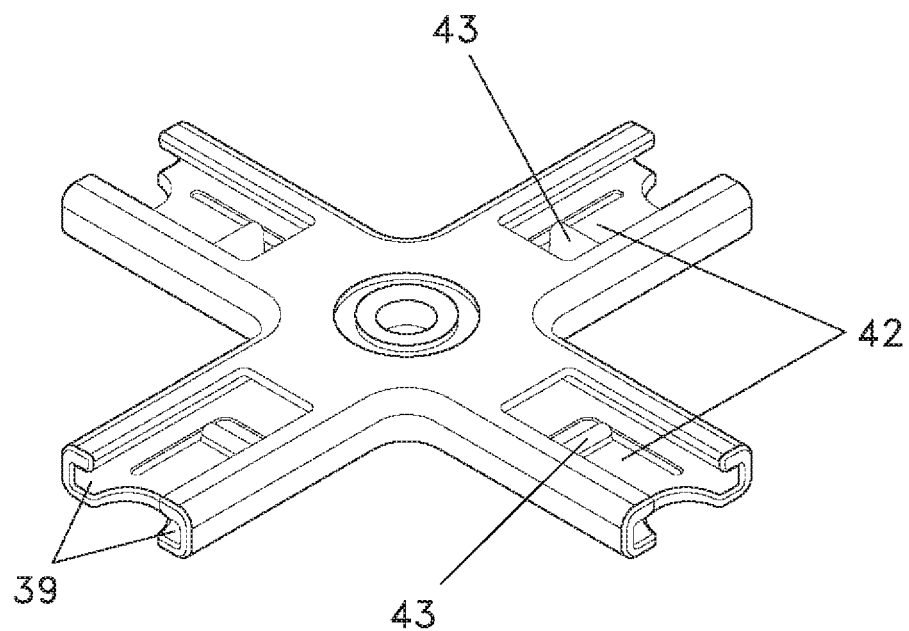
FIG. 23: is a top perspective view of a fitting display support tray in one embodiment thereof.
Figure 24:
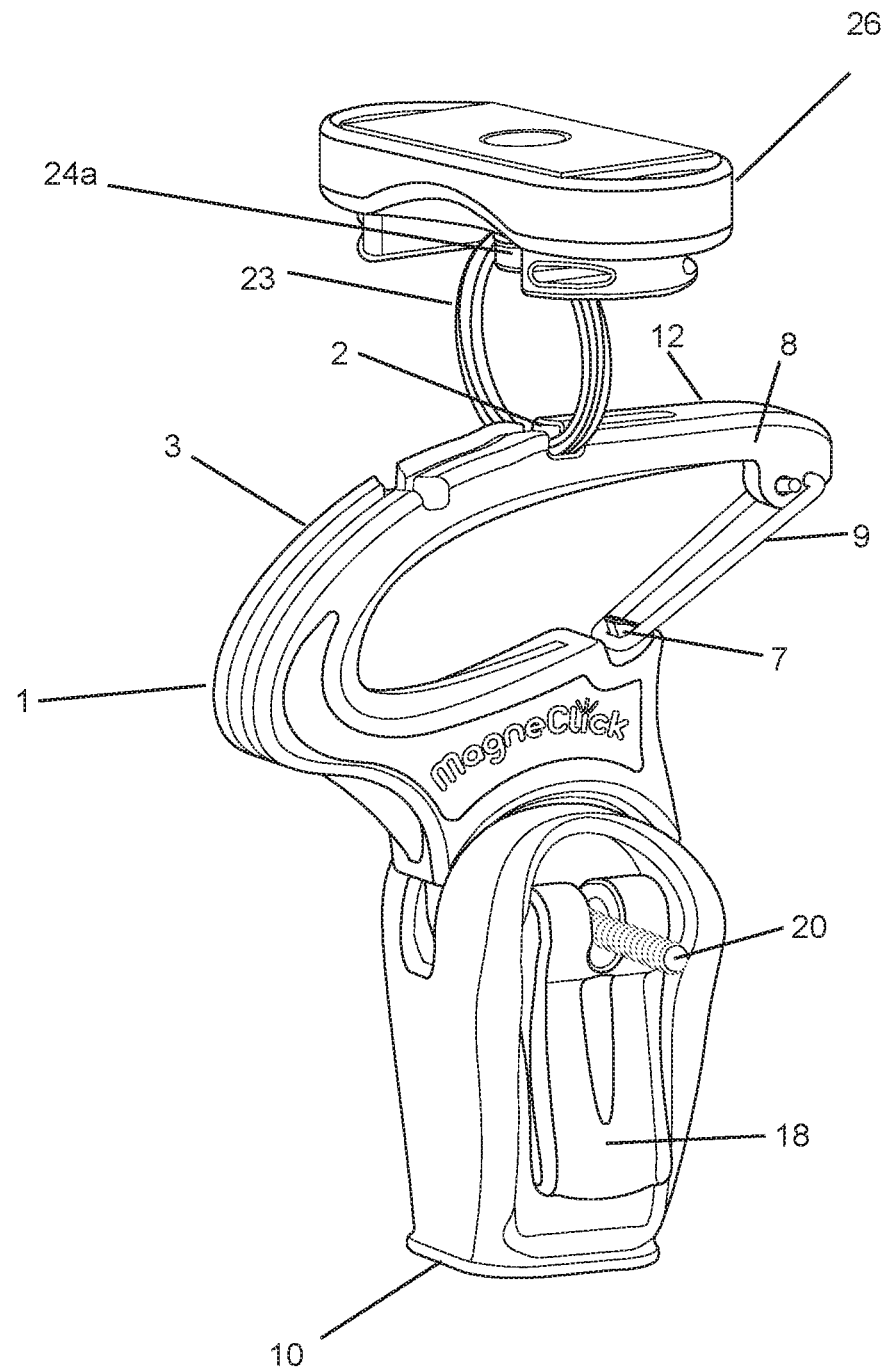
FIG. 24: is a perspective view of a display support system with a display fitting in one embodiment thereof.
Figure 25:
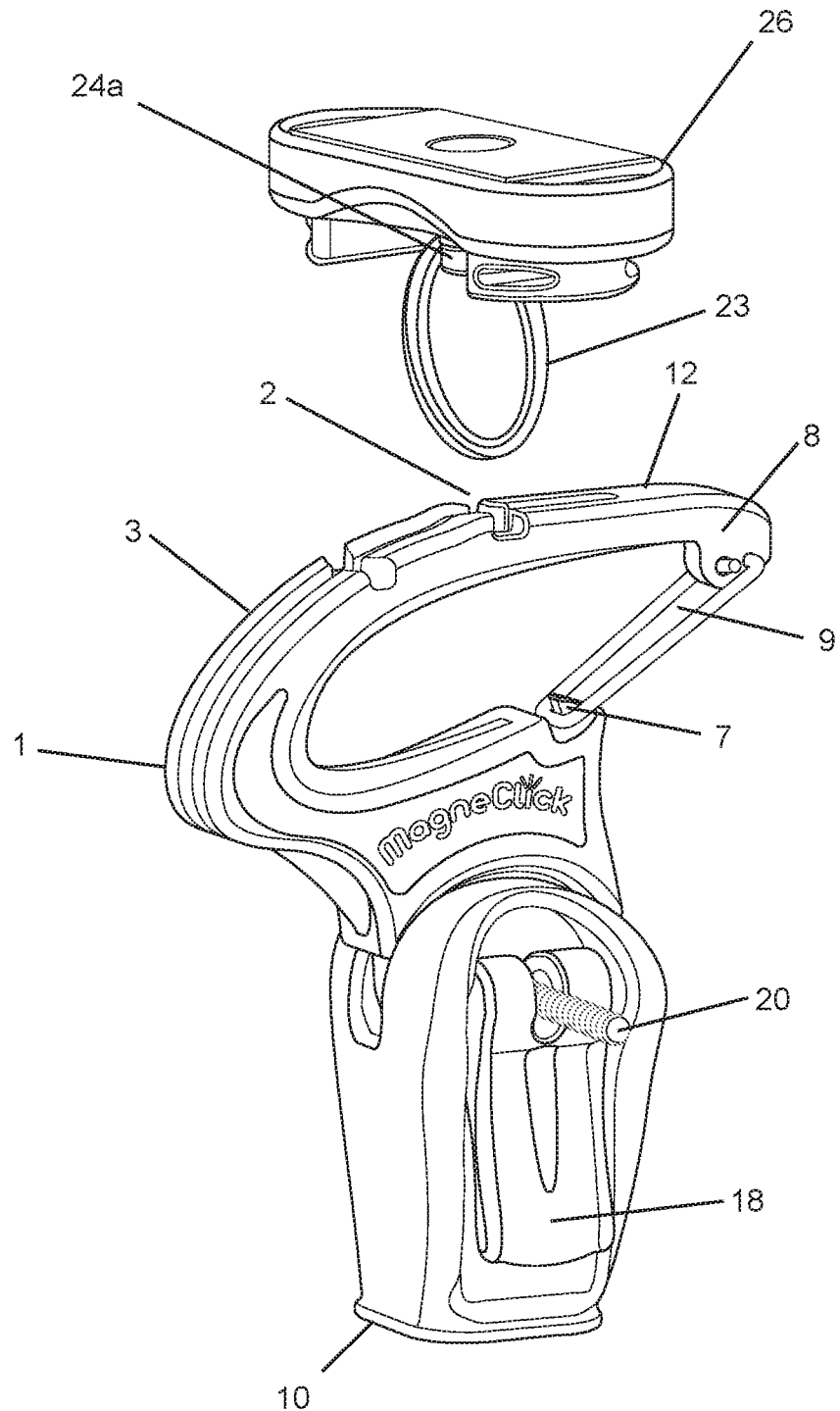
FIG. 25: is a perspective view of a display support system with a display fitting in one embodiment thereof.
Figure 26:
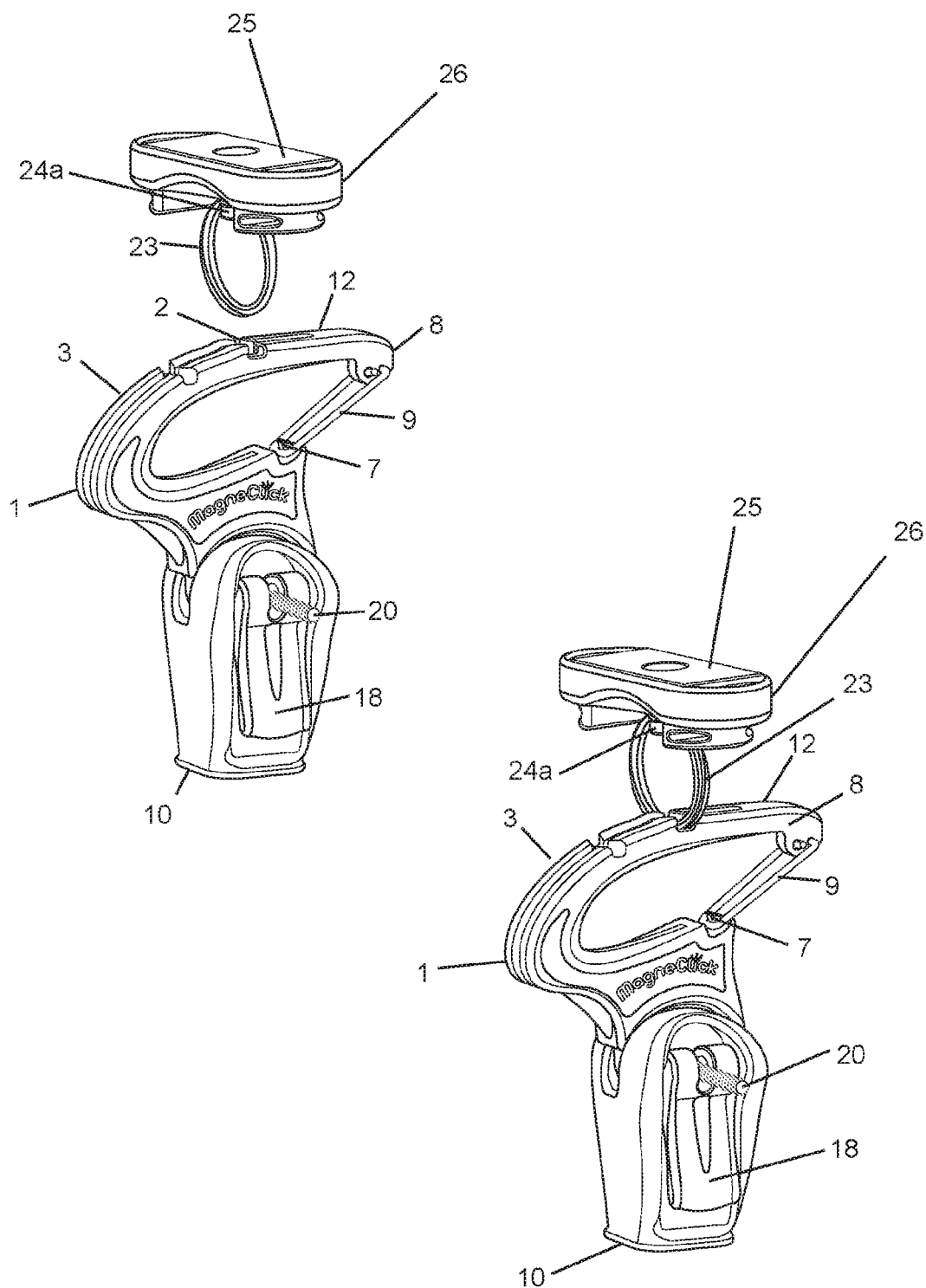
FIG. 26: are multiple perspective views of a display support system with a display fitting in one embodiment thereof.

As generally shown in FIGS. 19-23, in still other preferred embodiments, the inventive technology may include a fitting display support tray (37) configured to be coupled with a plurality of fitting displays (26). For example, as shown in FIG. 19, in certain embodiments it may be desired to secure a plurality of fitting displays (26) to support a display. It may also be desired to secure them to a surface, such as a ceiling in an "X" pattern to provide maximum support. Similar to the discussion above, such fitting display support tray (37) may be secured with fitting display adaptor (31) through one or more fitting display channels (36A). Again, as discussed above, this coupling may further include a plurality of internal or external compressible fitting display support catches (42). It should also be noted that the current system may be adapted to a dual fitting support bridge (28). In addition, the current inventive technology may be configured to be modular such that a plurality of fitting display support trays (37), naturally having a variety of shapes and configurations, may be coupled together as desired by a user to provide the optimal number of display fittings in an optimal configuration. In addition, such fitting display adaptor (31) and fitting display support trays (37) may further be adjustable to be capable of being placed in a variety of configurations and positions. In other embodiments, a fitting display support tray (37) may include a catch position that may be caught by a display fitting support hook (1*a*) having a support latch (9).

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a improved display support system and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention may be described in some instances in method-oriented terminology, each element of the claims corresponds to a device and vice versa. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The patent application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing an improved display support system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention, such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:
1. A display support system comprising:
 a fitting support having:
  at least one display fitting support hook;
  at least one display fitting aperture configured to secure at least one fitting display;
  at least one support latch; and
  an adjustable support plate;
 a support adapter having an adjustable support plate interface configured to be coupled with said adjustable support plate;
 at least one fitting display configured to be coupled with a display having:
  at least one attachment surface configured to transiently attach to an external surface; and a display fitting attachment configured to be coupled with said display fitting support hook.

2. A display support system as described in claim 1 wherein said display fitting aperture comprises a tractable display fitting aperture.

3. A display support system as described in claim 2 and further comprising at least one external lock position configured to secure said support adapter and said fitting support.

4. A display support system as described in claim 1 wherein said support latch comprises a support latch coupled with a support latch slot and a support catch.

5. A display support system as described in claim 1 wherein said adjustable support plate comprises an adjustable support plate having at least one adjustable support plate projection configured to be coupled with at least one projection slot on said support adapter.

6. A display support system as described in claim 5 wherein said support adapter comprises a support adapter having at least one projection channel.

7. A display support system as described in claim 3 wherein said external lock position comprises at least one cam configured to be coupled with at least one barrel nut and at least one locking bolt.

8. A display support system as described in claim 1 wherein said attachment surface comprises an attachment surface selected from the group consisting of: a magnetic attachment surface, an adhesive attachment surface, a latched attachment surface, a suction attachment surface, a Velcro attachment surface, a locking attachment surface.

9. A display support system as described in claim 1 wherein said display fitting attachment comprises a display fitting attachment configured to be coupled with said tractable display fitting aperture.

10. A display support system as described in claim 9 wherein said display fitting attachment comprises display fitting attachment having one at least one adjustable ring holder coupled with at least one ring.

11. A display support system as described in claim 1 and further comprising at least one tractable fitting channel on said display fitting support hook.

12. A display support system as described in claim 1 and further comprising an extender configured to be coupled with an extension joint on said support adapter.

13. A display support system as described in claim 1 wherein said adjustable support plate comprises an adjustable support plate having at least one adjustable support plate projection and at least one adjustable support plate aperture.

14. A display support system as described in claim 2 wherein said display fitting attachment configured to be coupled with said display fitting support hook comprises a display fitting attachment configured to be coupled with said tractable display fitting aperture.

15. A display support system comprising:
   a fitting support having:
      at least one display fitting support hook;
      at least one tractable display fitting aperture configured to secure at least one fitting display;
      at least one support latch; and
      an adjustable support plate;
   a support adapter having an adjustable support plate interface configured to be coupled with said adjustable support plate;
   at least one fitting display configured to be coupled with a display having:
      at least one attachment; and
      a display fitting attachment configured to be coupled with said display fitting support hook;
   at least one external lock position configured to secure said support adapter and said fitting support wherein said external lock position comprises at least one cam configured to be coupled with at least one barrel nut and at least one locking bolt.

16. A display support system as described in claim 15 wherein said display fitting aperture comprises a tractable display fitting aperture.

17. A display support system as described in claim 16 and further comprising at least one external lock position configured to secure said support adapter and said fitting support.

18. A display support system as described in claim 15 and further comprising at least one tractable fitting channel on said display fitting support hook.

19. A display support system as described in claim 15 and further comprising an extender configured to be coupled with an extension joint on said support adapter.

* * * * *